US008423587B2

(12) United States Patent
Timmons

(10) Patent No.: US 8,423,587 B2
(45) Date of Patent: Apr. 16, 2013

(54) SYSTEM AND METHOD FOR REAL-TIME CONTENT AGGREGATION AND SYNDICATION

(75) Inventor: Michael Timmons, San Jose, CA (US)

(73) Assignee: Sybase, Inc., Dublin, CA (US)

( * ) Notice: Subject to any disclaimer, the term of this patent is extended or adjusted under 35 U.S.C. 154(b) by 0 days.

(21) Appl. No.: 13/287,287

(22) Filed: Nov. 2, 2011

(65) Prior Publication Data
US 2012/0047176 A1 Feb. 23, 2012

Related U.S. Application Data

(63) Continuation of application No. 12/026,791, filed on Feb. 6, 2008, now Pat. No. 8,055,685, which is a continuation of application No. 10/908,449, filed on May 12, 2005, now abandoned.

(51) Int. Cl.
*G06F 17/30* (2006.01)
*G06F 17/27* (2006.01)

(52) U.S. Cl.
USPC .............................................. 707/803; 704/9

(58) Field of Classification Search ........................ None
See application file for complete search history.

(56) References Cited

U.S. PATENT DOCUMENTS

| | | | |
|---|---|---|---|
| 5,404,435 A * | 4/1995 | Rosenbaum | 715/205 |
| 5,465,353 A * | 11/1995 | Hull et al. | 1/1 |
| 7,181,438 B1 | 2/2007 | Szabo | |
| 7,555,713 B2 | 6/2009 | Yang | |
| 7,836,051 B1 * | 11/2010 | Mason | 707/734 |
| 2002/0059227 A1 | 5/2002 | Narahara | |
| 2002/0188841 A1 * | 12/2002 | Jones et al. | 713/153 |
| 2003/0061115 A1 * | 3/2003 | Wachi | 705/26 |
| 2003/0225750 A1 | 12/2003 | Farahat et al. | |
| 2004/0017512 A1 | 1/2004 | Tachikawa | |
| 2004/0054661 A1 | 3/2004 | Cheung et al. | |
| 2004/0216034 A1 * | 10/2004 | Lection et al. | 715/500.1 |
| 2005/0114327 A1 | 5/2005 | Kumamoto et al. | |
| 2005/0154690 A1 * | 7/2005 | Nitta et al. | 706/46 |
| 2005/0160014 A1 * | 7/2005 | Moss et al. | 705/26 |
| 2005/0278358 A1 * | 12/2005 | Doughan | 707/100 |
| 2006/0112079 A1 * | 5/2006 | Holt et al. | 707/3 |

* cited by examiner

*Primary Examiner* — Tarek Chbouki
(74) *Attorney, Agent, or Firm* — Edell, Shapiro & Finnan, LLC

(57) ABSTRACT

A system and methodology for real-time content aggregation and syndication is described. In one embodiment, for example, a method is described for assisting a user with extracting items relevant to search queries from documents including items of various types, the method comprises steps of: receiving a search query specifying a search phrase and a particular item type; identifying documents matching the search phrase; for each matching document, determining whether the document includes an item having the particular item type; and extracting items having the particular item type from the matching documents for display to the user. The solution enables a user to aggregate and syndicate content without a professional content manager or complicated content management software tools.

15 Claims, 13 Drawing Sheets

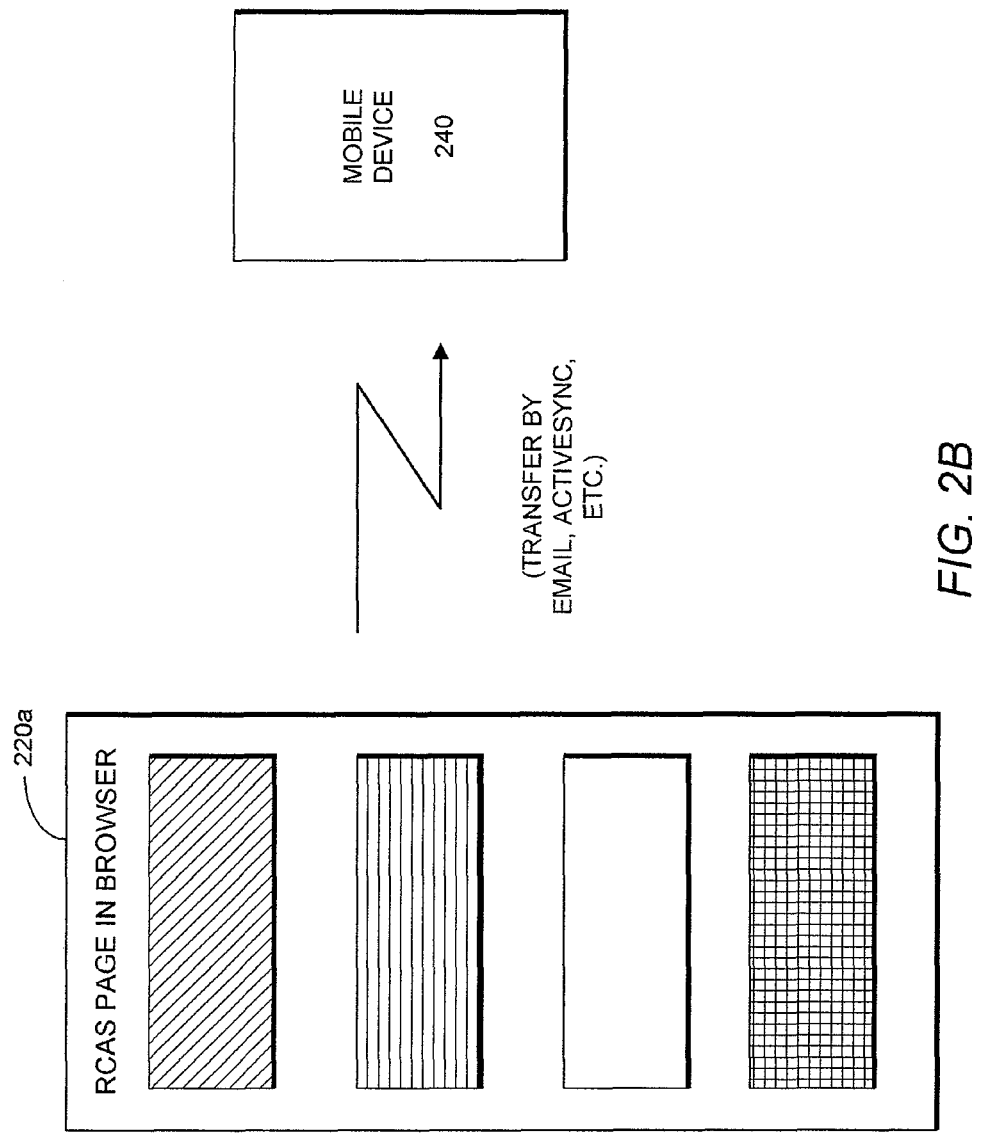

SYSTEM AND METHOD FOR REAL-TIME CONTENT AGGREGATION AND SYNDICATION

CROSS REFERENCE TO RELATED APPLICATIONS

The present application is a continuation of prior application Ser. No. 12/026,791, filed Feb. 6, 2008, which is a continuation of prior application Ser. No. 10/908,449, filed May 12, 2005, and is related to the following commonly-owned, presently-pending application(s): application Ser. No. 10/709,475, filed May 7, 2004, entitled "System and Methodology for Extraction and Aggregation of Data from Dynamic Content"; application Ser. No. 10/708,187, filed Feb. 13, 2004, entitled "Information Messaging and Collaboration System". The disclosures of each of the foregoing applications are hereby incorporated by reference in their entirety, including any appendices or attachments thereof, for all purposes.

COPYRIGHT STATEMENT

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. Field of the Invention

The present invention relates to the field of information content retrieval and processing. More particularly, the present invention relates to a system and methodology for aggregating and syndicating dynamic content.

2. Description of the Background Art

Computers are very powerful tools for storing and providing access to vast amounts of information. The first computers were largely stand-alone units with no direct connection to other computers or computer networks. Data exchanges between computers were mainly accomplished by exchanging magnetic or optical media such as floppy disks. Over time, more and more computers were connected to each other and exchanged information using Local Area Networks ("LANs") and/or Wide Area Networks ("WANs"). Initially such connections were primarily amongst computers within the same organization via an internal network. More recently, the explosive growth of the Internet has provided access to tremendous quantities of information from a wide variety of sources.

The Internet comprises a vast number of computers and computer networks that are interconnected through communication links. The World Wide Web (WWW) portion of the Internet allows a server computer system to send graphical Web pages of information to a remote client computer system. The remote client computer system can then display the Web pages in a Web browser application (e.g., Netscape® Navigator, Mozilla Firefox, or Microsoft', Internet Explorer). To view a specific Web page, a client computer system specifies the Uniform Resource Locator ("URL") for that Web page in a request (e.g., a HyperText Transfer Protocol ("HTTP") request). The request is forwarded to the Web server that supports that Web page. When that Web server receives the request, it sends the specified Web page to the client computer system. When the client computer system receives that Web page, it typically displays the Web page using a browser application.

Currently, Web pages are typically defined using Hyper-Text Markup Language ("HTML"). HTML provides a standard set of tags that define how a Web page is to be displayed. When a user indicates to the browser to display a Web page, the browser sends a request to the server computer system to transfer to the client computer system an HTML document that defines the Web page. When the requested HTML document is received by the client computer system, the browser displays the Web page as defined by the HTML document. The HTML document contains various tags that control the displaying of text, graphics, controls and other features. The HTML document may also contain URLs of other Web pages available on that server computer system or other server computer systems. Web pages may also be defined using other markup languages, including cHTML, XML, and XHTML.

Every day, more and more information is made available via the Internet. The challenge posed to users is how to efficiently locate, access, and use information and applications that are relevant to them from amongst the huge quantities of materials that are available in a variety of different formats. The World Wide Web is made up of millions of "Web sites" with each site having a number of HTML pages (Web pages). Each HTML page usually has a number of Web objects on each page such as graphics, text, and "HyperText" references (URL's) to other HTML pages. For example, a user may wish to collect information from three different sources. Each of these sources may potentially maintain information in a different format. For instance, one source may be a database, a second may be a spreadsheet, and a third may be a Web page. In addition the information available at many sources is also regularly updated. Thus, there is also a need to identify and retrieve dynamically updated content from these diverse network sources.

Consider a typical example of user that accesses information available via the Internet. The user may access the Internet from a desktop or laptop computer (e.g., in her office) and may also use a wireless telephone or other handheld device (e.g., personal digital assistant or PDA) for Internet access when she is away from the office. The user typically uses a Web browser such as Microsoft Internet Explorer or Mozilla Firefox to "surf" the World Wide Web and locate information of interest. For instance, she may use a Web browser to locate and obtain a quote for a particular stock on a financial services Web site. Once the information is obtained, the Web browser typically provides some capability for the user to mark the source of this information so that she may return to it again at a later time. For example, she may "bookmark" a page of the financial services Web site that provides information about the particular stock. The browser may also have a "history" view that provides information regarding recently viewed items. However, the capabilities of current Web browsers for collecting and presenting information of interest are limited and place much of the burden or collecting and organizing information on the user. For instance, a user may have to go to the main menu of the Web browser and select a particular item under the "bookmarks" to return to particular previously-viewed item. Another complication is that the information may no longer be available when the user attempts to return to the previously-viewed item.

Another existing solution which provides for consolidating information for presentation to users is a Web "portal". A portal is a Web site that aggregates dynamic content from different content providers. A well-known example of a Web portal is Yahoo.com which assembles content from a variety of sources, organizes it into certain categories (e.g., sports, news, financial, entertainment, shopping, and so forth), and makes the assembled content available to users (e.g., in Web pages). Portals are a useful tool in consolidating certain types of content; however, the content that is available is determined by the organization running the portal (or its content managers) rather than by individual users. Current portal solutions are effective in delivery of "high-volume/public information." The Internet provides an almost endless stream of this type of information (sometimes also referred to as "high-traffic" content) which can be characterized as "impersonal" and is usually pre-selected by a content manager located somewhere between the source of the content and the user desiring access to the information. However, current portals are much less effective in delivering personalized content to users, particularly if the personalized content is not of general interest to a larger community (e.g., lower volume or lower traffic content).

Web portals typically provide users with certain capabilities to "customize" or "personalize" the information presented in the portal. A user may, for example, select the categories of information that are of interest (e.g., interested in news but not shopping). Some portals also enable users to indicate which categories are to be displayed in which portions of the Web page (e.g., news at the top of the Web page), select particular stocks to be included in financial portions of the Web page, and so forth. However, current solutions only provide limited customization capabilities and generally require users to select from items available in the catalog or repository of the portal operator. This is, in fact, a significant limitation of current portals. Current portals typically rely on a catalog which contains a limited collection (e.g., few hundred items) of content. The limited collection typically focuses on "high-traffic" items of content that are of wide general interest such stock quotes, national and international news, weather, sports information about major college and professional sports, and so forth. However, other types of information that are not of wide, general interest are usually not available through current portals. For example, a user may wish to collect information about local schools and athletic teams (e.g., high school or little league teams) that his children are involved with together with content from a club that he belongs to and information from his local homeowner's association. This type of "low-volume", highly personalized information is generally not aggregated and made available on any commercial portal.

What is needed is a solution that enables a user to easily and automatically collect information of interest from a variety of content sources, organize the information in a convenient format (e.g., on a single page), and display the collected information on various different types of devices. The solution should be easy to use so that the user can easily identify items of content which are then automatically collected without the user being required to take any further action. Ideally, the solution should automatically refresh the information periodically so that it remains current. The solution should also enable the user to select content available from a wide range of content sources for collection rather than to limit the user to a limited catalog or list of "high-traffic" items that are of general interest to many other users. The present invention provides a solution for these and other needs.

SUMMARY OF INVENTION

A system and methodology for real-time content aggregation and syndication is described. In one embodiment, for example, a method of the present invention is described for assisting a user with extracting items relevant to search queries from documents including items of various types, the method comprises steps of: receiving a search query specifying a search phrase and a particular item type; identifying documents matching the search phrase; for each matching document, determining whether the document includes an item having the particular item type; and extracting items having the particular item type from the matching documents for display to the user. The solution enables a user to aggregate and syndicate content without a professional content manager or complicated content management software tools.

In another embodiment, for example, a method of the present invention is described for generating a single document displaying items of content retrieved from one or more Web pages, the method comprises steps of: receiving a request for items of content, the request including keywords and extended attributes of items to be obtained; retrieving one or more Web pages based on the keywords; parsing each of the one or more Web pages into its component objects, each object representing an item of content from the given Web page; selecting particular objects matching the extended attributes of the request; and aggregating items of content corresponding to the particular objects into a single document for display.

In yet another embodiment, for example, a Web browser system of the present invention for dynamically generating a page displaying items of content extracted from sources of content available on a network is described that comprises: a user interface module for a user to navigate to sources of content available on the network, select particular items of content, and build a page composed of the particular items; a feature extraction module for automatically creating objects representing the particular items of content on the page built by the user; and a content collection module for dynamically generating the page by extracting the particular items of content from the sources of content via the network using the objects and aggregating the particular items for display on the page.

In another embodiment, for example, a system of the present invention for extracting items of content from documents available on the Internet in response to a search query is described that comprises: means for receiving a search query comprising a search phrase and specified attributes of items of to be obtained; means for obtaining a list of relevant documents in response to the search query based on matching terms of the search phrase to terms contained in the documents; means for retrieving a relevant document on the list and parsing it into a plurality of objects; means for determining a score value for each of the plurality of objects, the score value based on matching attributes of the object with the specified attributes of the search query; and means for extracting a particular object having a score value indicating relevance to the search query from the relevant document.

BRIEF DESCRIPTION OF DRAWINGS

FIG. 2B is a diagram illustrating the transfer of a viewpoint page to a mobile device.

DETAILED DESCRIPTION

Glossary

Figure 1:
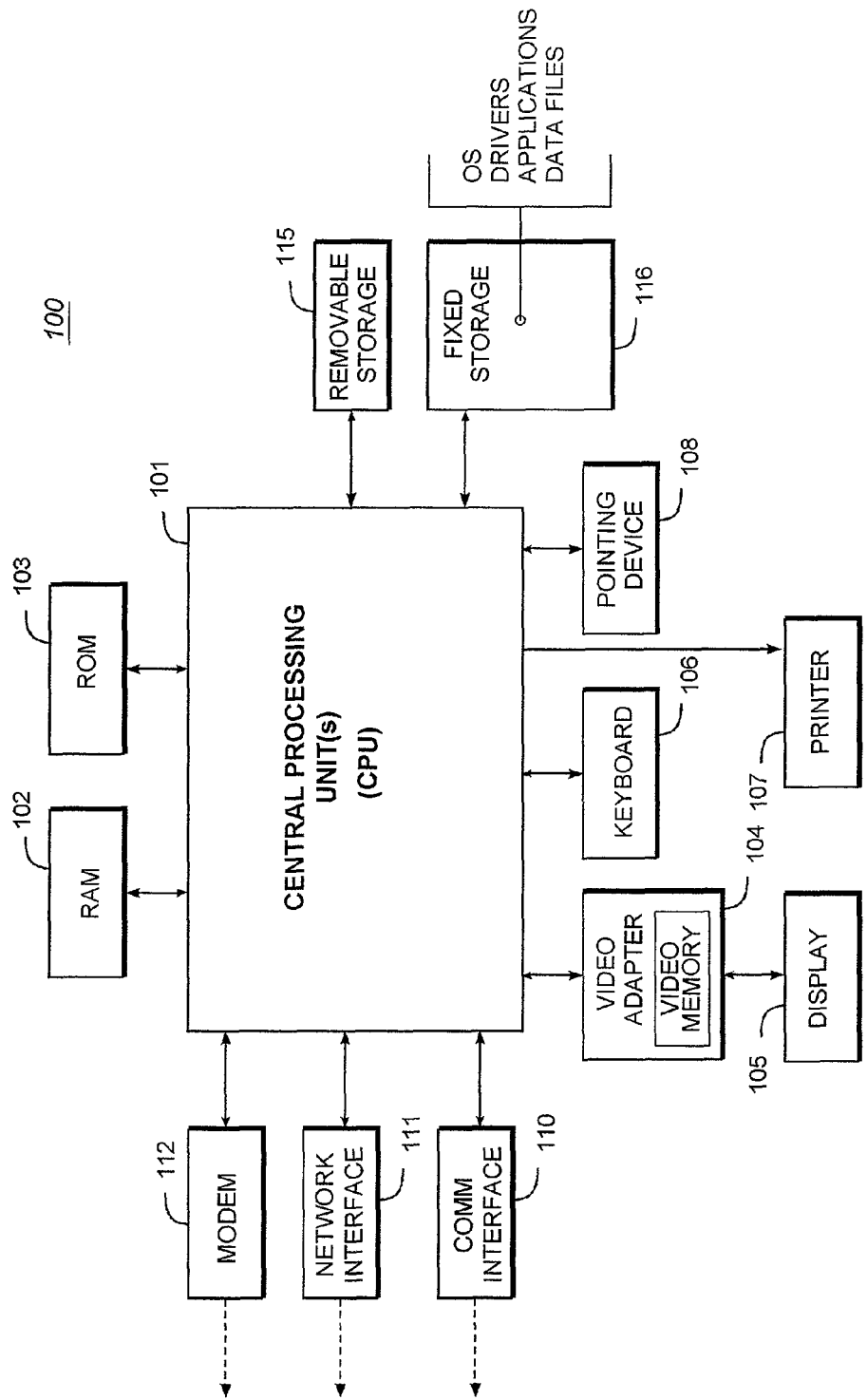
FIG. 1 is a very general block diagram of a computer system (e.g., an IBM-compatible system) in which software-implemented processes of the present invention may be embodied.

The following definitions are offered for purposes of illustration, not limitation, in order to assist with understanding the discussion that follows.

Bytecode: A virtual machine executes virtual machine low-level code instructions called bytecodes. Both the Sun Microsystems Java virtual machine and the Microsoft .NET virtual machine provide a compiler to transform the respective source program (i.e., a Java program or a C# program, respectively) into virtual machine bytecodes.

cHTML: Short for compact HTML, cHTML is a subset of HTML for small information devices, such as smart phones and PDAs. cHTML is essentially a pared down version of regular HTML. Because small devices such as cellular phones typically have hardware restrictions such as small memory, low power CPUs, limited or no storage capabilities, small mono-color display screens, single-character font and restricted input methods (the absence of a keyboard or a mouse), cHTML provides a simpler form of HTML for use with such devices.

HTML: HTML stands for HyperText Markup Language, the authoring language used to create documents on the World Wide Web. HTML defines the structure and layout of a Web document by using a variety of tags and attributes. For further description of HTML, see e.g., "HTML 4.01 Specification", a World Wide Web consortium recommendation dated Dec. 24, 1999, the disclosure of which is hereby incorporated by reference. A copy of this specification is available via the Internet (e.g., currently at www.w3.org/TR/REC-htm140).

HTTP: HTTP is the acronym for HyperText Transfer Protocol, which is the underlying communication protocol used by the World Wide Web on the Internet. HTTP defines how messages are formatted and transmitted, and what actions Web servers and browsers should take in response to various commands. For example, when a user enters a URL in his or her browser, this actually sends an HTTP command to the Web server directing it to fetch and transmit the requested Web page. Further description of HTTP is available in "RFC 2616: Hypertext Transfer Protocol—HTTP/1.1," the disclosure of which is hereby incorporated by reference. RFC 2616 is available from the World Wide Web Consortium (W3C), and is available via the Internet (e.g., currently at www.w3.org/Protocols/). Additional description of HTTP is available in the technical and trade literature, see e.g., Stallings, W., "The Backbone of the Web," BYTE, October 1996, the disclosure of which is hereby incorporated by reference.

Java: Java is a general purpose programming language developed by Sun Microsystems. Java is an object-oriented language similar to C++, but simplified to eliminate language features that cause common programming errors. Java source code files (files with a .Java extension) are compiled into a format called bytecode (files with a .class extension), which can then be executed by a Java interpreter. Compiled Java code can run on most computers because Java interpreters and runtime environments, known as Java virtual machines (VMs), exist for most operating systems, including UNIX, the Macintosh OS, and Windows. Bytecode can also be converted directly into machine language instructions by a just-in-time (JIT) compiler. Further description of the Java Language environment can be found in the technical, trade, and patent literature; see e.g., Gosling, J. et al., "The Java Language Environment: A White Paper," Sun Microsystems Computer Company, October 1995, the disclosure of which is hereby incorporated by reference. For additional information on the Java programming language (e.g., version 2), see e.g., "Java 2 SDK, Standard Edition Documentation, version 1.4.2," from Sun Microsystems, the disclosure of which is hereby incorporated by reference for purposes of illustrating the state of the art. A copy of this documentation is available via the Internet (e.g., currently at java.sun.com/j2se/1.4.2/docs/index.html).

JavaScript: JavaScript was designed by Netscape as an easy-to-use object-oriented scripting language that serves as an adjunct to the Java programming language. JavaScript is a small, lightweight language that is designed to be embedded in other products and applications, such as Web browsers. Inside a host environment, JavaScript can be connected to the objects of its environment to provide programmatic control over such objects. JavaScript code can be added to standard HTML pages to create interactive documents and has found considerable use in the creation of interactive Web-based forms. Most modern browsers, including those from Microsoft and Netscape, contain JavaScript support. For additional information on JavaScript, see e.g., McDuffie, T. "JavaScript Concepts & Techniques: Programming Interactive Web Sites (Chapters 1 and 2)", Franklin, Bedde, and Associates, January 2003, the disclosure of which is hereby incorporated by reference for purposes of illustrating the state of the art.

Network: A network is a group of two or more systems linked together. There are many types of computer networks, including local area networks (LANs), virtual private networks (VPNs), metropolitan area networks (MANs), campus area networks (CANs), and wide area networks (WANs) including the Internet. As used herein, the term "network"

refers broadly to any group of two or more computer systems or devices that are linked together from time to time (or permanently).

Portal: A portal provides an aggregated view of multiple resources (e.g., Web sites) and services. A portal typically offers a single access point (e.g., Web page on a server) providing access to a range of information and applications to clients. A portal assembles information from a number of different sources (e.g., Web sites and applications) enabling a client to quickly receive information without having to navigate to a number of different Web sites. A portal also typically organizes and groups information and services for presentation to clients.

TCP: TCP stands for Transmission Control Protocol. TCP is one of the main protocols in TCP/IP networks. Whereas the IP protocol deals only with packets, TCP enables two hosts to establish a connection and exchange streams of data. TCP guarantees delivery of data and also guarantees that packets will be delivered in the same order in which they were sent. For an introduction to TCP, see e.g., "RFC 793: Transmission Control Program DARPA Internet Program Protocol Specification", the disclosure of which is hereby incorporated by reference. A copy of RFC 793 is available via the Internet (e.g., currently at www.ietf.org/rfc/rfc793.txt).

TCP/IP: TCP/IP stands for Transmission Control Protocol/Internet Protocol, the suite of communications protocols used to connect hosts on the Internet. TCP/IP uses several protocols, the two main ones being TCP and IP. TCP/IP is built into the UNIX operating system and is used by the Internet, making it the de facto standard for transmitting data over networks. For an introduction to TCP/IP, see e.g., "RFC 1180: A TCP/IP Tutorial", the disclosure of which is hereby incorporated by reference. A copy of RFC 1180 is available via the Internet (e.g., currently at www.ietf.org/rfc/rfc1180.txt).

URL: URL is an abbreviation of Uniform Resource Locator, the global address of documents and other resources on the World Wide Web. The first part of the address indicates what protocol to use, and the second part specifies the IP address or the domain name where the resource is located.

XHTML: Short for Extensible Hypertext Markup Language, a hybrid between HTML and XML. XHTML is a family of current and future document types and modules that reproduce, subset, and extend HTML 4. XHTML family document types are XML based, and ultimately are designed to work in conjunction with XML-based user agents.

XML: Short for Extensible Markup Language, a specification developed by the W3C. XML is a pared-down version of SGML, designed especially for Web documents. It allows designers to create their own customized tags, enabling the definition, transmission, validation, and interpretation of data between applications and between organizations. For further description of XML, see, e.g., Extensible Markup Language (XML) 1.0 specification which is available from the World Wide Web Consortium (www.w3.org), the disclosure of which is hereby incorporated by reference. The specification is also available on the Internet (e.g., currently at www.w3.org/TR/REC-xml).

XPCOM (Cross Platform Component Object Model) is a simple, cross platform component model similar to CORBA or Microsoft COM. It has multiple language bindings and IDL descriptions so programmers can plug their custom functionality into the framework and connect it with other components. For further description of XPCOM, see e.g., Turner, D. and Oeschger, I. "Creating XPCOM Components", Chapters 1-3, Browhen Publishing, 2003, the disclosure of which is hereby incorporated by reference. A copy of this document is available via the Internet (e.g., currently at www.mozilla.orgiprojects/xpcom/book/cxc/pdficxc.pdf).

Introduction

Referring to the figures, exemplary embodiments of the invention will now be described. The following description will focus on the presently preferred embodiment of the present invention, which is implemented in desktop and/or server software (e.g., driver, application, or the like) operating in an Internet-connected environment running under an operating system, such as the Microsoft Windows operating system. The present invention, however, is not limited to any one particular application or any particular environment. Instead, those skilled in the art will find that the system and methods of the present invention may be advantageously embodied on a variety of different platforms, including Macintosh, Linux, Solaris, UNIX, FreeBSD, and the like. Therefore, the description of the exemplary embodiments that follows is for purposes of illustration and not limitation. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware, or combinations thereof.

Computer-Based Implementation

Basic system hardware and software (e.g., for desktop and server computers)

The present invention may be implemented on a conventional or general-purpose computer system, such as an IBM-compatible personal computer (PC) or server computer. FIG. 1 is a very general block diagram of a computer system (e.g., an IBM-compatible system) in which software-implemented processes of the present invention may be embodied. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real time system clock is included with the system 100, in a conventional manner.

CPU 101 comprises a processor of the Intel Pentium family of microprocessors. However, any other suitable processor may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP LaserJet printer (available from Hewlett Packard of Palo Alto, Calif.), for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Hewlett-Packard of Palo Alto, Calif., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

A software system is typically provided for controlling the operation of the computer system 100. The software system, which is usually stored in system memory (RAM) 102 and on fixed storage (e.g., hard disk) 116, includes a kernel or operating system (OS) which manages low-level aspects of computer operation, including managing execution of processes, memory allocation, file input and output (I/O), and device I/O. The OS can be provided by a conventional operating system, such as Microsoft Windows 9x, Microsoft Windows NT, Microsoft Windows 2000, or Microsoft Windows XP (all available from Microsoft Corporation of Redmond, Wash.) or an alternative operating system, such as the previously mentioned operating systems. Typically, the OS operates in conjunction with device drivers (e.g., "Winsock" driver—Windows' implementation of a TCP/IP stack) and the system BIOS microcode (i.e., ROM-based microcode), particularly when interfacing with peripheral devices. One or more application(s), such as client application software or "programs" (i.e., set of processor-executable instructions), may also be provided for execution by the computer system 100. The application(s) or other software intended for use on the computer system may be "loaded" into memory 102 from fixed storage 116 or may be downloaded from an Internet location (e.g., Web server). A graphical user interface (GUI) is generally provided for receiving user commands and data in a graphical (e.g., "point-and-click") fashion. These inputs, in turn, may be acted upon by the computer system in accordance with instructions from OS and/or application(s). The graphical user interface also serves to display the results of operation from the OS and application(s).

The above-described computer hardware and software are presented for purposes of illustrating the basic underlying desktop and server computer components that may be employed for implementing the present invention. For purposes of discussion, the following description will present examples in which it will be assumed that there exists a "server" (e.g., Web server) that communicates with one or more "clients" (e.g., desktop computers). The present invention, however, is not limited to any particular environment or device configuration. In particular, a client/server distinction is not necessary to the invention, but is used to provide a framework for discussion. Instead, the present invention may be implemented in any type of system architecture or processing environment capable of supporting the methodologies of the present invention presented in detail below.

Overview of System and Methodology for Real-Time Content Aggregation and Syndication The system and methodology of the present invention for real-time content aggregation and syndication enables users to create valuable collections of personalized content from general public sources of information. The Real-time Content Aggregation and Syndication (RCAS) system of the present invention provides means for capturing and aggregating data from sources with "repetitive records". The RCAS solution enables end users to simply and easily identify and extract content from a variety of data sources on the Internet and generate their own "personalized" syndication data feed.

The RCAS solution can be implemented as part of most client browser and server architectures and provides a vendor, network, data format, and device independent way of exchanging and aggregating information. Using the system and methodology of the present invention, a user can "re-purpose" information for a different time, place, bundle, or device. The RCAS system provides the user with the ability to select and collect information that is both "personal" and "low volume" and that would, therefore, never reach the attention of a content manager at a large portal or subscription service. As described above, existing portal solutions typically utilize a client-server architecture in which information is selected by a content manager(s) of the organization operating the portal and collected at a server (e.g., Web server).

End users are clients in this client-server scheme and are able to access the information has been collected at the Web server (portal). Although end users are often given some capabilities to customize the presentation of information collected at the server, they generally cannot specify the types of items that are collected. The present invention, in contrast, shifts the focus to the end user (client) and provides tools that the user can run inside a Web browser on one or more client devices (e.g., desktop computers, PDAs, and Smartphones). The present invention provides the clients themselves with tools for selecting, collecting, and customizing the information that is displayed on their devices. In the currently preferred embodiment, the system of the present invention is implemented as a plug-in to a Web browser that enables a user to select particular content to be displayed and also to customize the manner in which this selected content is displayed. A user may, for example, select a portion of a first Web page from a first source and a portion of a second Web page from a second source and aggregate this information with other information collected from other sources for display in a personalized "viewpoint" page. A viewpoint page is a custom collection of information created by the suer based on the information collected from several different sources.

The present invention provides a solution that eliminates an entire class of "middlemen" (e.g., commercial portals) between the information source(s) and the user. Using the RCAS solution of the present invention, a user can now select not only the information desired but also the location, time, and device used to access that information. For example, the user may shift selected information that is typically displayed in a browser running on his desktop or laptop computer to a mobile device such as a mobile phone or PDA. The capabilities of mobile devices are typically very limited compared to those of the traditional desktop or laptop computer. For example, the display screen size of the mobile device may be a fraction of that of a desktop computer. The user may, therefore, want to receive and display a different set of information on the mobile device than on the larger desktop machine. For instance, the user may track several stocks and have detailed information about those stocks displayed on his desktop computer. However, given the limited resources of the mobile device, he may only want quotes for particular stocks (e.g., particular ones that he owns) displayed on the mobile device. Other information of lesser interest is essentially filtered out. Another reason for being more selective about the information that is displayed on the mobile device is that the bandwidth available to transfer information to the device may be limited and/or the user may be obligated to pay fees based on the usage of this bandwidth (e.g., based on number of bytes transferred, time, or the like).

The present invention meets the need for customizing the types of information and the manner and timing of its delivery to users by providing features to "syndicate" the collection and dissemination of information. For example, the RCAS system can collect specified content (including updates to previously supplied information) at an established frequency (e.g., hourly) and provide the results back to a user or workgroup. All or a portion of the information that is collected can then be presented to the user at the locations, times, and devices specified by the user. This provides considerable flexibility and convenience to users. The system and methodology of the present invention enables a new category of innovative applications to be built that extend the use of both Internet browsers and mobile devices (e.g., handheld devices). The present invention may be used to develop and implement applications (sometimes referred to herein as RCAS applications) that have one or more of the following characteristics:

1. "Time shifting"—for capturing content that can be later replayed at a time convenient to the user.

2. "Place shifting"—allowing the user to select content to be viewed on various different devices (e.g., a desktop computer or a mobile device such as a PDA or Smartphone).

3. "Bundle shifting"—for extracting "only what I want" from a bundle of information products and separating desired content from unwelcome content such as advertisements (e.g., "pop-up" ads).

4. "Device shifting"—re-purposing of media from one media/protocol to another selected by the user.

By integrating this functionality into Web browsers, the present invention provides a very broad audience with the ability to personalize information and share it with others.

The present invention can be used for aggregating, customizing, and displaying content on a wide range of devices which are equipped with browsers. Given that Internet connectivity features and browsers are increasingly being built into a broader range of devices, the present invention may be used in a wide range of different scenarios on various types of devices to give users more control in organizing and disseminating content to the various devices that they may use. It also enables them to better share selected information with others. Some examples of scenarios in which the present invention may be advantageously used will next be described.

Use of RCAS System for Collecting and Sharing Information of Various Types

Figure 2A:
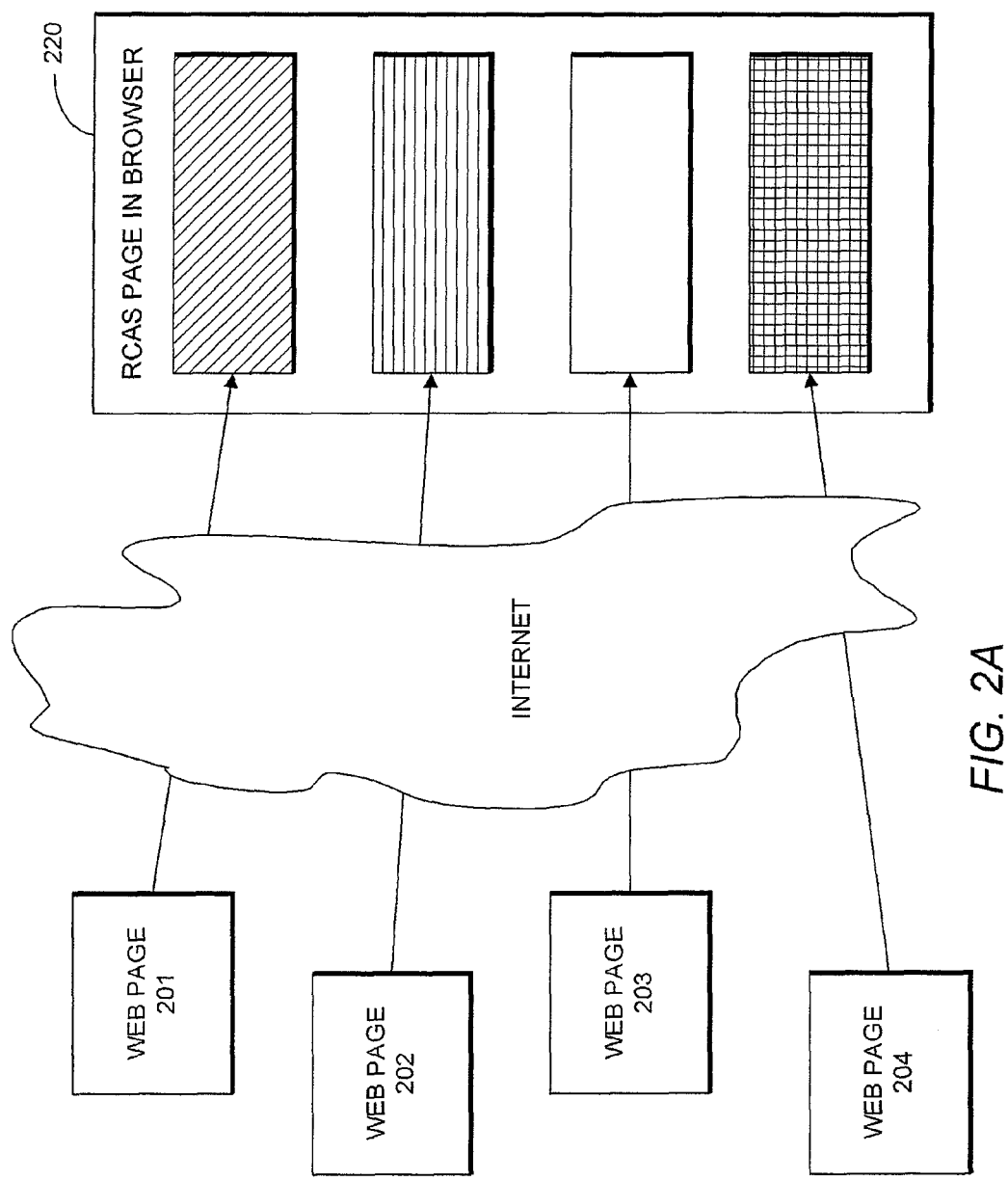
FIG. 2A is a diagram illustrating the creation of a custom viewpoint page (RCAS page) based on content from multiple Web pages.

A user may have a number of news articles and blogs that he accesses via the Internet and reads regularly (e.g., each day), typically by browsing various Web sites using a Web browser. The present invention provides a mechanism for collecting this information and presenting it to the user automatically. Instead of browsing to each Web page of interest, the user can use the RCAS system to quickly build a summary page of news articles collected from many sources. Unlike other Web services, the system of the present invention will retrieve articles and build financial models from a Web page (s) even if the content on the page(s) has been modified. A users can create a custom "viewpoint"—which is the user's own personal perspective or view of selected, collected information. FIG. 2A is a diagram illustrating the creation of a custom viewpoint page based on content from multiple Web pages. As shown, a user can select four different Web pages 201, 202, 203, 204 and specify that a portion of each of these pages is displayed on his "viewpoint" page 220. The viewpoint page is HTML page in the browser that the user designs using the RCAS system and methodology of the present invention.

After the user has built the viewpoint page (now 220a), he can also send (e.g., email) this page to his handheld device. FIG. 2B is a diagram illustrating the transfer of a viewpoint page 220a to a mobile device 240. As shown, the viewpoint page (or RCAS page) 220a is made up of several sources of information. The user can transfer this viewpoint page to the mobile (e.g., handheld) device 240 by email. Those skilled in the art will appreciate that the page can be transferred to the device by various other mechanisms, such as over a peer-to-peer network, by "ActiveSync" of the handheld device with the desktop (e.g., using a cradle), and so forth. In a case where "ActiveSync" is used to download aggregated content to the mobile device, the user could build a collection (viewpoint page) using the desktop browser and place the viewpoint page in the sync folder. The next time the mobile device is placed in the docking cradle, the viewpoint page is transferred to the handheld device. At the mobile device 240, the user can open up a mobile browser to view the content included on the viewpoint page. It should be noted that the user can transfer the whole viewpoint page from the desktop computer to a mobile device or can send only a subset of the viewpoint page (e.g., by creating a second viewpoint page for display on the mobile device). For instance, a user may have six items displayed on a viewpoint page on his desktop computer, but select only three of these items for display on a page on the mobile device. A user going on a trip may, for example, select the particular items that she wants to track while traveling and create (e.g., on the desktop) a viewpoint page for the mobile device. She may then synchronize the desktop and mobile devices so that the viewpoint page for collecting and displaying the selected information is downloaded to the mobile device. With the installation and use of the present invention on the mobile device, the mobile device can then track and update the selected information while she is traveling (e.g., obtain updates to the three items at a frequency she has specified).

The system and methodology of the present invention has several advantages compared to existing mobile-browser implementations. With the present invention, the mobile-browser user will only receive content (e.g., articles and financial models) that are of interest. Undesired content is not delivered to the mobile-browser. The user's desktop browser can also be used to schedule "content aggregation" of information (e.g., articles and financial models) from time to time and then send the aggregated content to the mobile device. This takes advantage of the greater resources typically available on the desktop and the fact that many desktop browsers are always connected to the Internet (e.g., by DSL, cable modem or the like). The content can also be customized based on device capabilities. For example, if the user desires, only the title of each article and an article snippet are displayed on the mobile device. Also, when the user clicks on the link to the original source the RCAS software on the mobile device will retrieve only the desired article without all of the surrounding Web content on the HTML Web page. This scenario "shifts" the information content designed for a desktop browser to a handheld device. Another advantage is that the present invention does not require any "server" application to provide aggregated information content to a mobile device. The present invention can be used by almost any user that has a Web browser and enables content to be syndicated to a large number of mobile devices. In addition, information retrieval can be performed without storing the content in a "repository" of some kind. Information remains fresh and timely without the additional complexity of a database repository for storing content.

Figure 2C:
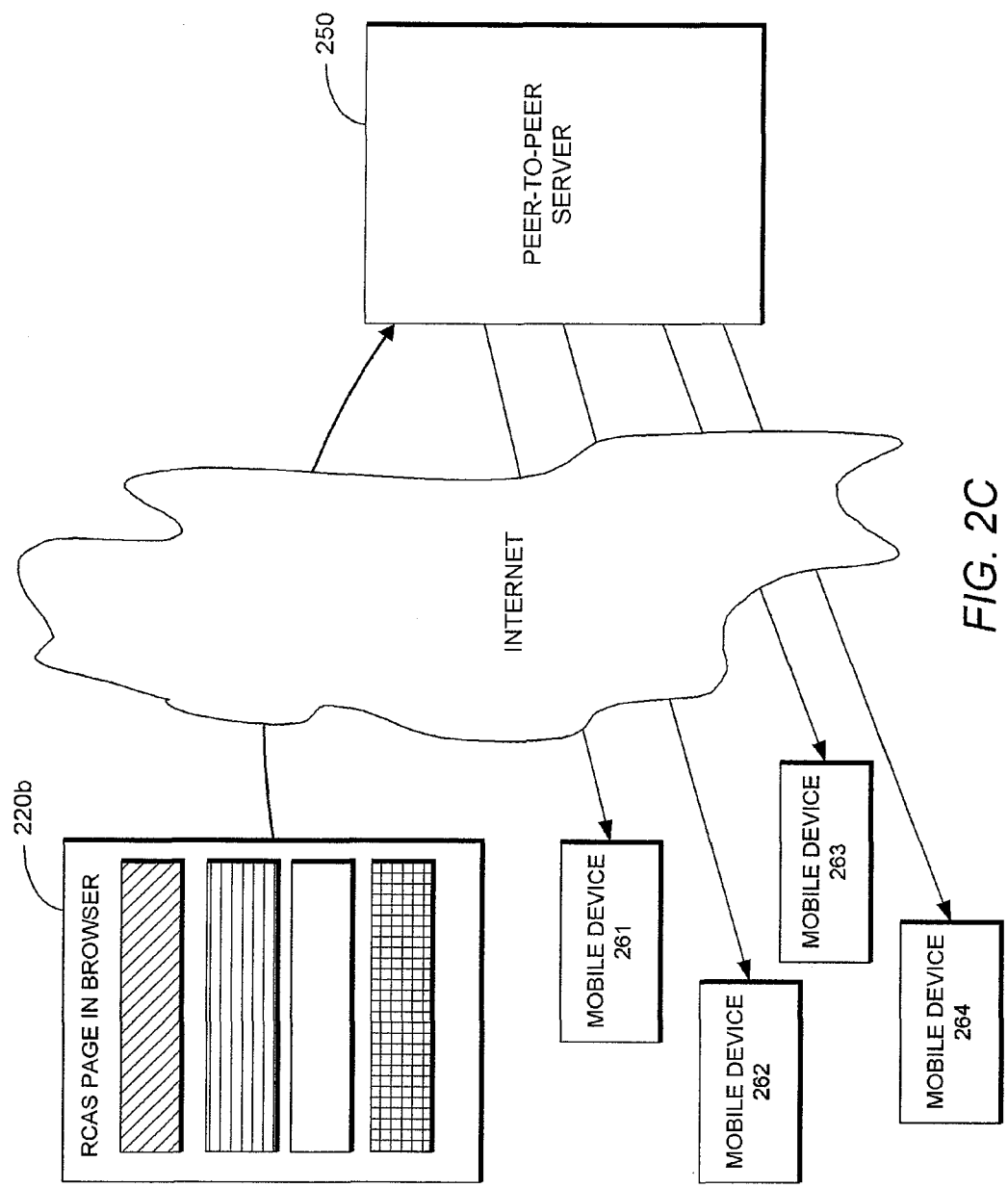
FIG. 2C is a diagram illustrating an example in which collected content is made available to a plurality of mobile devices.

The collection of information represented in the viewpoint page can also be sent to subscribers (i.e., others that are interested in the information). FIG. 2C is a diagram illustrating an example in which collected content is made available to a plurality of mobile devices. For instance, a "local soccer club news" viewpoint page 220b can be created and uploaded to the server (e.g., an open peer-to-peer server). As shown at FIG. 2C, the viewpoint page 220b is uploaded to a peer-to-peer server 250. The page is then accessible by other members of the community that are interested in the information (e.g., mobile devices 261, 262, 263, 264 as shown at FIG. 2C). The user uploading the page can inform the other members of the name of the file, or members can search the server for collections of content. This type of approach enables individuals to create very informative pages that are shared and improved upon by a group or team. The user can also schedule his desktop browser to aggregate and syndicate information at time intervals during the day. An email can be sent to the distribution list of subscribers whenever a new aggregation is published to the P2P server. In this fashion, the present invention enables individuals to easily publish information of interest to make it available to a larger community. A user can take advantage of these aggregation and syndication features of the present invention without the need for commercial subscription accounts.

Using a "score and select" feature of the present invention (described below in more detail) the user can also search an existing collection such as Google, AltaVista, Yahoo, or the like. The RCAS system searches the list of URLs of the result pages one by one to find "articles" on each page that are of interest. Instead of "surfing" the results (e.g., URLs of found by search engine), the system of the present invention automatically presents the user with a selected list of article titles and article snippets. This feature is particularly valuable on handheld devices which often have limited keyboard/input mechanisms and limited display capabilities. Web surfing on this type of device can be rather difficult as they frequently do not include a mouse. As with the scenarios described above, the aggregated search results can be emailed and/or syndicated to make the results available to others.

Another application or feature of the present invention is in identifying a particular "object" on a page and then associating that object with an action. Using the browser user interface of the present invention, a user can identify text styles with certain actions. For example, a collection of article titles may be displayed together with a snippet of each article in the user interface. When the user selects (e.g., clicks-on with the mouse) "Next" or "Previous" icons, the next or last article is read aloud to the user via text-to-speech software. By clicking on the "This" button, the snippet or the entire article is read aloud to the user. This "hands-off" navigation feature is particularly useful for small screen devices or when the user is driving. Using the RCAS toolbar provided in the currently preferred embodiment of the present invention, a content manager can quickly add Web-To-Speech actions to a legacy HTML Web site so that any handheld user can navigate the Web site using only voice commands and listen to information of interest.

The present invention can also be used to aggregate emails in a user's inbox and deliver the aggregate information to the user. This feature can also be used with the above-described "text-to-speech" feature to provide "hands-off" email delivery. An application of this hands-off content delivery feature involves the system of the present invention running on an mp3 player (e.g., Apple iPod Shuttle mp3 player) which does not have a screen. The present invention can be used for aggregating content and attaching a voice to it. In this case, one can aggregate several different articles and then download them to the mp3 player (e.g., by docking an iPod shuttle without a screen with desktop computer). A user can listen to the downloaded articles on the iPod, page through them, and so forth. In a similar manner, information could also be downloaded to other devices having browsers and/or Internet connectivity features (e.g., a Playstation portable) for display. Another usage scenario is in aggregating photo collections. The present invention can be used to aggregate photo collections and then share them with others without having to use a commercial photo service (e.g., photo service Web site) for these purposes. For example, the system can be used to "spider" through a Web site (e.g., a commercial photo service site) to extract the "type" of photos desired by a particular user.

System Components

The system and methodology of the present invention makes it possible for an individual to easily collect and aggregate information from any Internet-available source that is reachable with a browser. The present invention turns a browser in which it is implemented into a content collection and aggregation tool and provides a number of features and functions. It can "bypass" current capture technology page markup to select content and perform JavaScript parsing. All capture playback is done using ajavaScript interpreter and page layout/formatter within the browser. The present invention also enables complicated "frameset" and "application capture" problems to be accomplished using the browser's JavaScript and frameset routines. Security capture problems are also reduced, if not eliminated, by using authentication software within the browser. Information identified and collected with the system can also be synchronized with most popular handhelds for playback.

Figure 3:
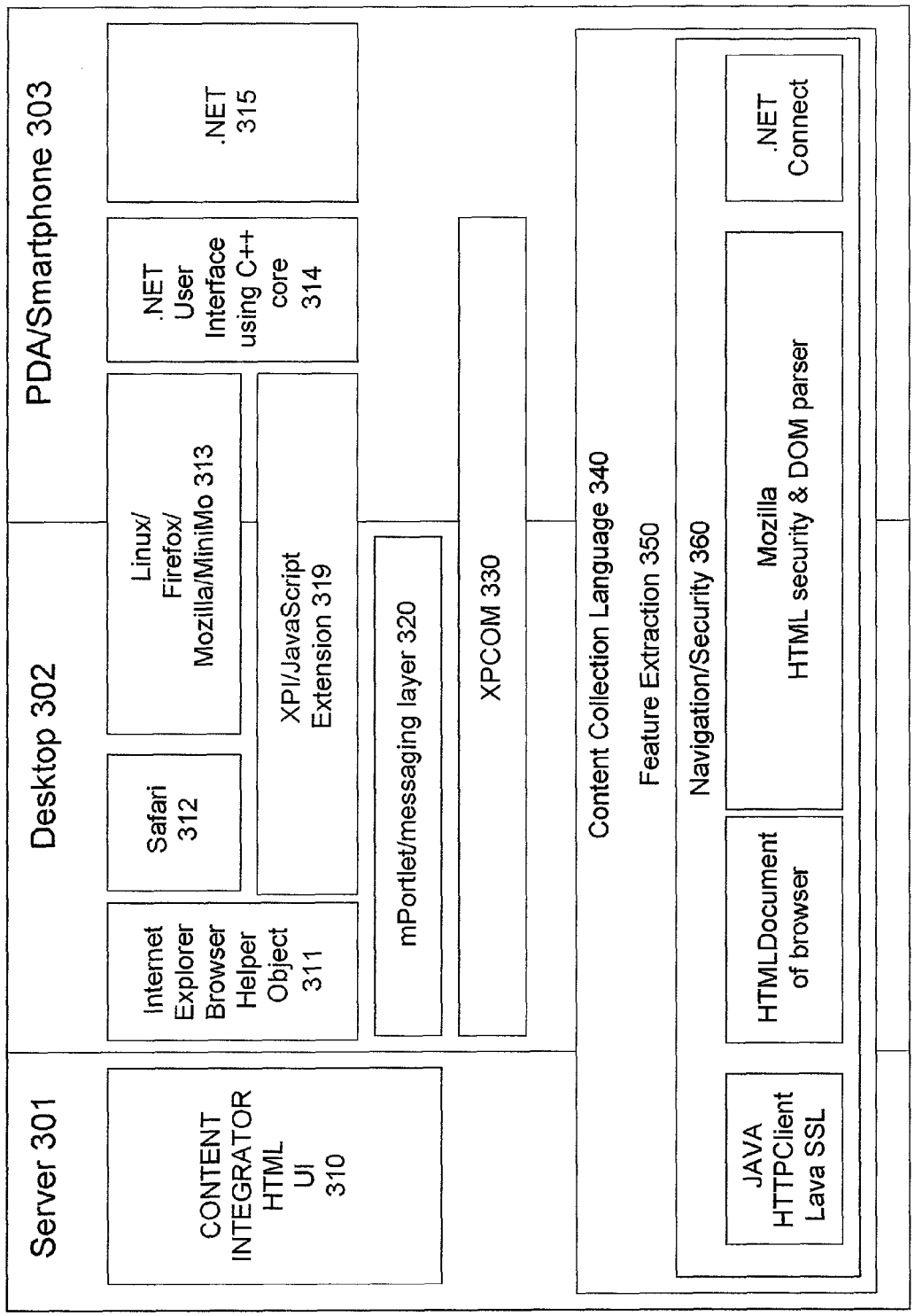
FIG. 3 is a block diagram illustrating components of the currently preferred embodiment of the present invention which can be implemented in server, desktop, and mobile environments.

FIG. 3 is a block diagram illustrating components of the currently preferred embodiment of the present invention which can be implemented in server, desktop, and mobile environments. FIG. 3 depicts the implementation of the present invention on three different platforms or operating environments:—a server implementation 301, a desktop implementation 302, and a mobile device (e.g., PDA or Smartphone) implementation 303. As shown, the present invention can be implemented in multiple configurations. The present invention operates in conjunction with several browsers which are employed on server, desktop and mobile devices, including Internet Explorer (as illustrated at 311), Safari 312, Firefox/Mozilla/MiniMo 313, and .NET 314/315 implementations as illustrated at FIG. 3. In a desktop configuration, for instance, the present invention can be configured using an "Browser Helper Object" of Microsoft Internet Explorer (e.g., as shown at 311 at FIG. 3). For Macintosh Safari and Linux environments, a Mozilla "Extension" architecture is utilized. In a PDA/Smartphone implementation, the system of the present invention can be installed to "playback" content captured using a desktop version of the system. The PDA/Smartphone is currently implemented using .NET connect or a scaled down version of Mozilla called "MiniMo". In the currently preferred embodiment for desktop and mobile devices, the components of the present invention are all implemented inside a browser plug-in module which enables the present invention to be operated on a wide range of computing platforms and devices.

The system of the present invention includes user interface features which assist a user in selecting content to be aggregated and organizing the selected content for display as hereinafter described. On desktop and mobile devices, the user interface is integrated with the interface of the browser. On the server, an HTML user interface may be provided as illustrated at 310 at FIG. 3. The user interface presents various tools and capabilities enabling users to aggregate, organize, and syndicate content. A user can, for example, draw a square or rectangle on screen and then "drag" particular content from a source into the drawn area on the page as hereinafter described in more detail. Below the user interface layer at FIG. 3 is an mPortlet messaging layer 320. The mPorlet messaging layer is an optional component which enables a user to create messaging portlets (mPortlets) which may take action in response to events. A messaging portlet can also be combined with other mPortlets to create an integrated Web based application. A user can also build a "messaging container" or "mContainer" based on several mPortlets. Messaging portlets provide users with a mechanism for developing new business process and analysis techniques. For further description of messaging portlets, see commonly-owned, co-pending application Ser. No. 10/708,187, the disclosure of which is hereby incorporated by reference.

Another component which is used in the currently preferred embodiment of the present invention is an XPCOM layer or module 330. XPCOM is a standard open source component which allows one to write code in one place and run it on several different platforms. XPCOM, which stands for Cross Platform Component Object Model, is a framework for writing cross-platform, modular software. As an application, XPCOM uses a set of core XPCOM libraries to selectively load and manipulate XPCOM components. XPCOM components can be written in C, C++, and JavaScript, and they can be used from C, C++, and JavaScript with extensions for Perl and Python that are under development. In addition to modularity, XPCOM offers agility across platforms as it supports most platforms that host a C++ compiler, including: Microsoft Windows (all flavors), Linux, HP-UX, AIX, Solaris, OpenVMS, MacOS, and BSD. For further description of XPCOM, see e.g., Turner, D. and Oeschger, I. "Creating XPCOM Components", Chapters 1-3, Browhen Publishing, 2003, the disclosure of which is hereby incorporated by reference. A copy of this document is available via the Internet (e.g., currently at www.mozilla.org/projects/xpcom/book/cxc/pdf/cxc.pdf). Using the XPCOM "object model" enables the present invention to be implemented in a single source code library which can be called from .NET, Java, JavaScript, C or C++.

What is shared by all of these implementations is shown at the bottom of FIG. 3, namely, the following components: Content Collection Language 340, Feature Extraction 350, and Navigation/Security 360. Embodiments of the invention include a recursive scripting language, or "Content Collection Language" (CCL) 340, for identifying and accessing objects distributed over the Internet. In embodiments of the invention, short scripts written in the scripting language are used in place of URLs: unlike URLs, which are designed for referencing static data, scripts written in the Content Collection Language may point to "dynamic" data that is constantly updated. The CCL statement can be used just like a URL. The Content Collection Language is a dynamic language, in contrast to "static" languages that have a fixed list of keywords. As such, interpretation of a dynamic language, such as the Content Collection Language, employs only the code required for interpreting the individual commands present in a script and not the totality of commands in the language. For example, in the Content Collection Language, interpretation of a command such as "LOAD( )" does not require loading all of the unused keywords simply to execute the command, as in this case, to load a document. In embodiments of the invention, the Content Collection Language employs the capacity to instantiate a class dynamically to implement the various commands in the Content Collection Language. Thus a command can register additional commands that it may require in its execution dynamically. A script written in the Content Collection Language may be interpreted over a distributed set of processors. For instance, a portion of a script may be executed at a client browser, while another portion of the script may be executed at a server coupled to the client via the Internet.

The Content Collection Language is a recursive, object-oriented scripting language in which commands and parameters in the language are treated identically, and commands are executed in the order in which they are nested. Each command is made up of three parts, the Command Name, the Params (parameters), and the Next Command. The following is an example of a CCL command: CCL_COMMAND (param1,param2(CCL_NEXT (XXXXXXXXXXXXXXXXX))

In the above example, "CCL_COMMAND" is the Command Name. The local parameters are in the parenthesis: "(param1,param2). The Next Command is "CCL_NEXT". "(XXXXXXXXXXXXXXXXX)" represents a String Artifact. When each CCL_COMMAND is run it will: (1) parse and save the local parameters; (2) parse the name of the Next Command and instantiate the Next Command; and (3) pass the "String Artifact" to the Next Command. Generally, processing does not take place until all CCL_COMMANDS have been created. The "most nested" command is processed first and returns its results to its creator. Each command is executed using the results from its "nested child" until the final result is returned to its creator. Commands are "chained" to obtain specific content results. The result is a single string command which can be used in a manner similar to a URL to describe content anywhere on the Web. To illustrate, consider a script encoded in the Content Collection Language for retrieving a graphic from a financial news site: GRAPHIC ((ANCHOR(/sandp.html(LOAD(foo_financial.com/markets/)))))

This description uses three commands to capture the S&P chart from the foo_financial.com page. The LOAD command reads the foo_financial.com/markets/Web page. ANCHOR captures an anchor associated with "sandp.html", while GRAPHIC reads a graphic object when passed a URL. As shown in this example, the Content Collection Language executes the command that is most deeply nested first. If this is successful, the next most deeply nested command is executed and so forth until all of the commands have either returned an error message or executed successfully. Once elementary commands are in place, they can be combined algebraically to produce additional commands in the Content Collection Language. Each command is made up of parameters and the Next Command to produce a third CCL command as a result. Each CCL command returns a collection of objects as a result of its parameters and the Next Command. For example, the CCL descriptor NEWSLIST((LOAD (foo_news.com)) returns a "collection" or list of all anchors separated by a delimiter that could be identified as a news list item.

Set operations in CCL include: (a) union function: all elements of collection A that contain parameter B; and (b) exclusion function: all elements of collection A that do not contain parameter B. Operations possible in CCL include:
BEFORE: Each element of collection A that are BEFORE parameter B.
AFTER: Each element of collection A that are AFTER parameter B.
FIRST: First element of a collection A.
FIRSTNUM: First NUMBER of collection A.
LAST: Last element of a collection A.
LASTNUM: Last NUMBER of collection A.

Embodiments of the invention also include a Feature Extraction module (or object) 350 used for identifying similar information objects. This makes it possible to divide and sort page contents from several pages into groups sharing similar attributes, which are contained in a Feature Extraction object. In this way information brokers and publishers can aggregate information from several sources into a new information object. The Feature Extraction module 350 provides for reducing a Web page to its smallest network objects and creating a Feature Extraction "tag" or "Web fingerprint" of the object; this tag may be referenced again to find the object in the future. In embodiments of the invention, Feature Extraction uses "fuzzy logic" to ensure that targeted content is identified and collected after a source page has been updated with fresh information or graphics. This feature provides "version control" of the attribute tags as information changes and new types of Internet standards are adopted. By using this approach to version control, an information aggregation system can save an attribute tag and continue to update and extend its capturing and publishing system. While the system evolves, the older attribute tag will continue to point back accurately to the desired information recorded earlier. Web publishers and other users can use Feature Extraction tags as an "alias" to information on a page that will allow them to identify and modify other areas on a page while maintaining the alias intact.

A Feature Extraction tag of an information object comprises a number of "fuzzy rules" or attributes describing the information object. For instance, a Feature Extraction tag for a graphic object could be "G0ABMMZA001". The first character of the tag "C" defines the type of net object, with the character "G" being reserved for a graphic object. The second character "0" defines this tag as a graphics tag version "0" so that one can easily add or modify tags and maintain backward compatibility. The "ABMMZA" characters describe the capture attributes, and "001" is a numeral indicating the occurrence of the graphic object on the page. In this case "G0ABMMZA001" is the first occurrence of several "ABMMZA" objects on the page. The attributes are ranked with the most significant attribute left-most in the tag with "A" being the highest value and "Z" being the lowest value for any attribute.

For example when the URL of a page is passed to the Feature Extraction indexer, the page is retrieved from the Internet and each "container object" is analyzed or parsed one at a time. A container object for HTML is the TABLE tag that is used for page layout. Each TABLE tag may have many tables which, in turn, have nested tables of their own. Each container (TABLE) is separated from the target page into a new data object containing only information for that particular container. As each TABLE is parsed, objects in that table are created for each element of the TABLE such as, by way of a non-limiting example, a headline, graphic object, or button. Within each of these element tags is information that is used to produce the element's feature tag. The Feature Extraction module processes the page to build all element tags within a container and all container tags within a page.

Feature extraction attributes are constructed using an "Inside->Out" method instead of an "Outside->In" approach. With an "Outside->In" approach, a page is tagged by building a list of table attributes from the top of the page to the desired capture target. With the "Inside->Out" approach used in the present invention, the table attributes are limited to a particular table, or container, table, and its contents. The benefits of the "Inside->Out" approach of the present invention are that advertising banners or other graphics can be added to the top or the bottom of the page, and the table, with its contents, can be moved, without disrupting the identification of the desired object. As long as the contents inside the table remain structurally unchanged the correct table for a generated tag will be collected. This allows capture tags to remain useful and accurate even when the pages are being modified by the publisher. This feature of the invention is commonly referred to as "persistence", and the approach used by this invention to mark and collect information is more "persistent" than other approaches in the prior art.

Feature extraction objects can be used to capture discrete net objects on a page such as a headline, graphic image, or button. Tags are also generated for distinct areas on the page, which may be a single container (TABLE), or an area made up of several nested containers. Feature extraction tags can be combined to create more accurate and persistent tags for very complicated Web pages. For example, a container tag can be combined with any element tag (graphic, headline, form, etc.) to produce a very accurate extraction tag even for the most crowded of pages. In embodiments of the present invention, the fuzzy logic of the attributes is used to extract an object using not only the content of the element itself (headline, graphic, button) but also the context of the element on the page. A situation where this is especially powerful is on very dense pages, such as a news portal, where there may be a large number of headlines that have very similar attributes. Another situation where the above technique can be used to retrieve data on the base of context is when extracting column and row data from a "spreadsheet" type of document on a page that has several "spreadsheet" displays of data. When creating the Feature Extraction tag, one may choose between a simple "element" tag or a "compound" tag, made up of a container tag and an element tag, depending on the page and the object being captured.

The information retrieval processes of the present invention uses tags that have been generated previously to load a page of information and subsequently extract the desired information defined by the tag. For example, assume the URL of a page is passed with a "target" tag to the Feature Extraction indexer. The page is retrieved from the Internet and each "container object" is parsed one at a time. Each container is examined to see if "this container tag" equals the "target" tag. If this container matches the target then the information within this container is returned to the caller. Next, the container is examined to see if the target tag is an element within that particular container. If an element matches the target tag, then that element's information is returned to the caller. If all containers on a page are examined without a match being found, the present invention makes it possible to find the "nearest" object if an "exact" object match is not found. This is done by a "de-fuzzy" search from the least significant (rightmost) attribute to the most significant (leftmost) of the attributes in a tag. For example, if an exact match were not found for the tag "G0ABMMZA001" the search would look in the following order: G0ABMMZB001, G0ABMMZC001, G0ABMMZD001, G0ABMMZE001, G0ABMMY*001, G0ABMMX*001, G0ABMMV*001, G0AB***001.

In effect, the search proceeds right to left for the best fit, narrowing the search on the most significant attributes. The information retrieval module can be tuned for different solutions to provide a very fine or a very coarse fuzzy match of the tag to the target field. This tag notation also makes it possible to use wildcards to get all of the graphics from a page with a tag of "G0ABMMM**", and operators such as get all of the_tags "greater than">G0ABMMZA. The Feature Extraction module (object) includes a "getContainer( )" method that will return any element's container. This feature is used on the "zoom-out" so the user can select the content (graphic, headline, button) or the desired context (area) at the same time. By passing a container tag, the target tag container's container will be returned. For example, assume that the URL of a page is passed with a "target" tag to the Feature Extraction "getContainer( )" method. The page is retrieved from the Internet and then each "container object" on the page is parsed one at a time. Each container is examined to see if the target tag is an element or a nested container within that particular container. If an element or nested container matches the target tag then that container's information is returned to the caller. If all containers on a page are examined without a match, the "nearest" object's container is returned.

The present invention may also be used to "post-process" information in order to filter out undesired content from an otherwise good information retrieval. For example, a headline capture tag that collects all of the major headlines on a popular Web site may have some "navigation" or "site related" elements within that capture that are not desired when this information is added to an aggregated collection of headlines from multiple sites. Some examples of visible text that would not be desired when doing headline aggregation would be: "show more", "click here", "email to", and the like. To subtract these kinds of text from a headline capture the following tag may be used: L0TTTTTTTTTTT003HHHHHHHaaaaaaabbbbbbb. In this example, L0 is the headline tag list, TTTTTTTTTTT003 is the area in which the headlines are to be captured from, HHHHHHH is the tag for the desired headlines, and aaaaaaabbbbbbb instruct the indexer to remove headline type aaaaaaa and bbbbbbb from the collection. In other words, collect headlines HHHHHHH and remove from that capture headlines with a tag of aaaaaaa and bbbbbbb.

Feature Extraction tags may also be used to accurately "rank" or "score" information objects within a collection of objects in a database or on a page. For example, a page can be divided into information objects, and the user will be shown only the "most important" objects on the page. A search engine can use this ability to do a standard lexical search and subsequently return only the most important information objects of the search results. For example, links returned by a search engine may be examined using the Feature Extraction technology of this invention to parse each search result page into atoms and subsequently score the page for its quality content. Depending on the content score, different Feature Extraction objects are used to collect data from the page. In one embodiment, a page with a high "headline" score will be parsed and displayed using a headline capture process. A page with a high text score may be displayed using an "article" capture object. A high graphic score may be displayed by use of a graphic capture object. The "score and select" search methodology of the present invention is described below in greater detail.

The RCAS system also includes a navigation/security module 360. The navigation and security features of the present invention include mechanisms facilitating collection of content from the Internet and displaying the collected content. During the collection process, a user to can use a Web browser to navigate to a Web page on the Internet and then "mark" content. The navigation/security module 360 includes functionality for tracking a number of parameters as a user navigates (or travels) to various Web sites and "marks" content to be collected. In navigation mode, as the user clicks on hypertext links on a page the present invention records these actions. The user may continue to navigate until she reaches the page that contains the desired target content. This process allows the user to "drill down" many pages deep into a Web site looking for the desired target information. This process also makes it possible to save all of the "Web parameters" necessary to reach the target information again without user intervention. For example, username, password, and other items such as search criteria are all monitored and saved during navigation to be used to recollect the information again mechanically and quickly.

Once the desired content is visible within the browser the user can click on a "stop recording" (or "stop") button. The user can engage in a dialog at this point to identify the item or items on the page to be collected. Alternatively, the page can be marked and the user can select the particular items of interest at a later point. The system includes a user interface which provides various options for displaying and selecting content from the target Web page(s) as hereinafter described.

For example, a preview page screen or view is provided to display objects on a target Web page and allow the user to choose particular objects of interest (e.g., by clicking on an "add to page" or "add" button to save an object for inclusion as part of the user's viewpoint page). The Content Collection Language, Feature Extraction, and Navigation/Security components are described in further detail in commonly-owned co-pending application Ser. No. 10/709/475, the disclosure of which is hereby incorporated by reference, for all purposes. The system browser toolbar user interface provided in the currently preferred embodiment of the present invention and some operations that can be performed using the toolbar will next be described.

RCAS System Browser Toolbar User Interface

Figure 4A:
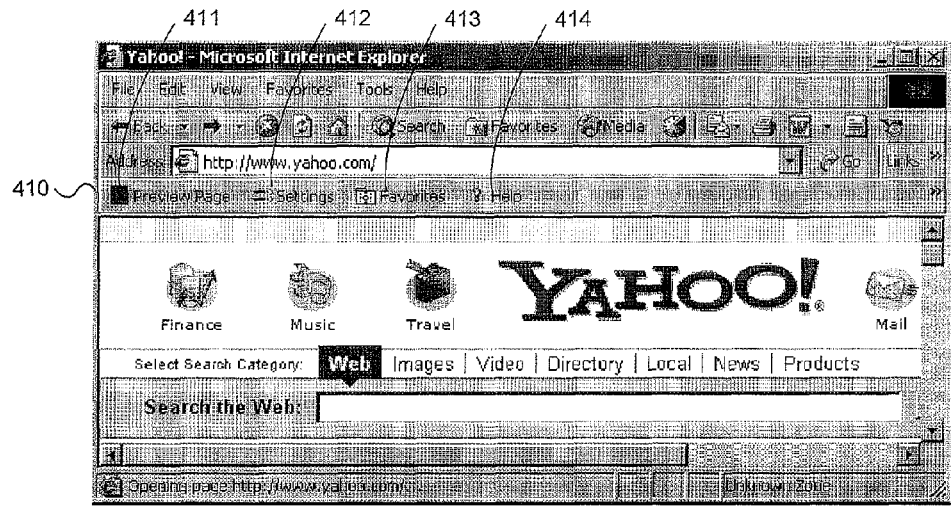
FIG. 4A is a screenshot illustrating a view of the browser toolbar user interface provided in the currently preferred embodiment of the present invention.

The RCAS system provides a convenient interface to assist users in building a viewpoint page for aggregating information of interest from the data sources (e.g., Web pages) selected by the user. In operation, the use of the system of the present invention in extracting and using desired information from one or more Web pages generally proceeds as illustrated by the following examples. FIG. 4A is a screenshot illustrating a view of the browser toolbar user interface 410 provided in the currently preferred embodiment of the present invention. As shown, the toolbar 410 loads inside of an Internet browser such as Microsoft Internet Explorer or Mozilla Firefox. In its presently preferred embodiment, the toolbar includes several icons or buttons which allow the user to take various actions and/or present other menus, icons, or dialogs which enable the user to take action. On toolbar 410, the user may select a "Preview Page" icon 411 to preview pages. Settings can be viewed and changed using a "Settings" button 412. A list of favorite pages can be obtained via "Favorites" icon 413. Help information is available by selecting the "Help" icon 414.

Figure 4B:
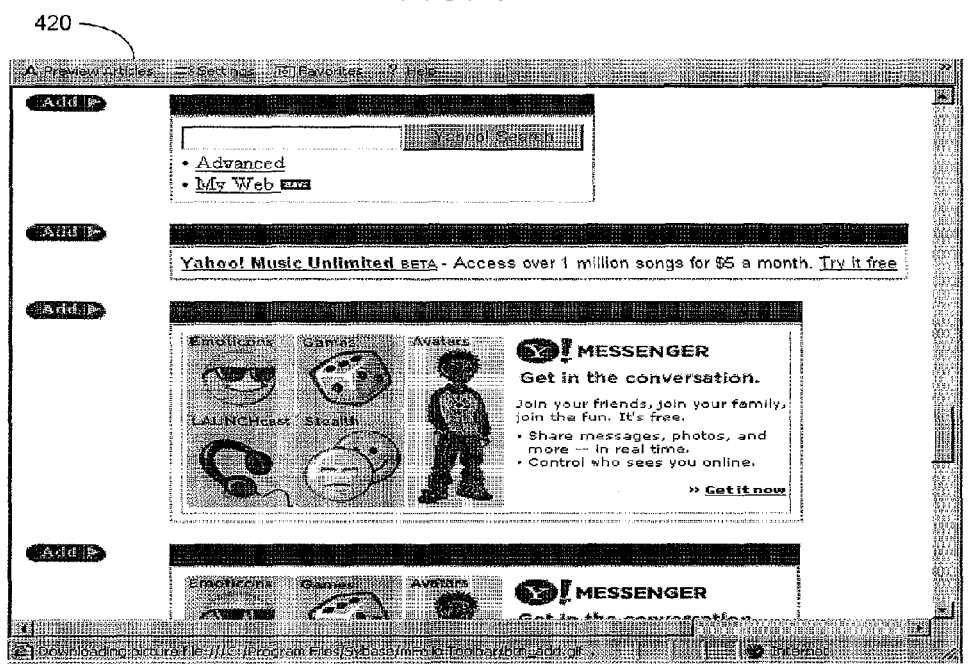
FIG. 4B is a screenshot illustrating a sample page preview.

A user typically first locates one or more sources of information (e.g., particular Web sites) from which he wishes to capture information. During this process the above—described navigation features of the present invention track user activity as the user searches various Web sites looking for information of interest. After the user has identified sources of information that are of interest, he can proceed to select the particular content which should be extracted from these sources and indicated how the output should be organized. The user may, for example, select the "Preview Page" icon 411 at FIG. 4A to obtain a list of the possible extraction combinations for a given page. FIG. 4B is a screenshot illustrating a sample page preview 420. As shown, the sample page preview 420 includes a list of the items that a user may select for inclusion in the viewpoint page under construction. The user may, for example, select one or more of the items to be added to the viewpoint page. Behind the scenes, the Feature Extraction module of the present invention parses the identified Web page(s) into "atoms" of information (or objects) as previously described. The Feature Extraction technology is also used to "extract" the desired items of information from the information sources in real time.

Figure 4C:
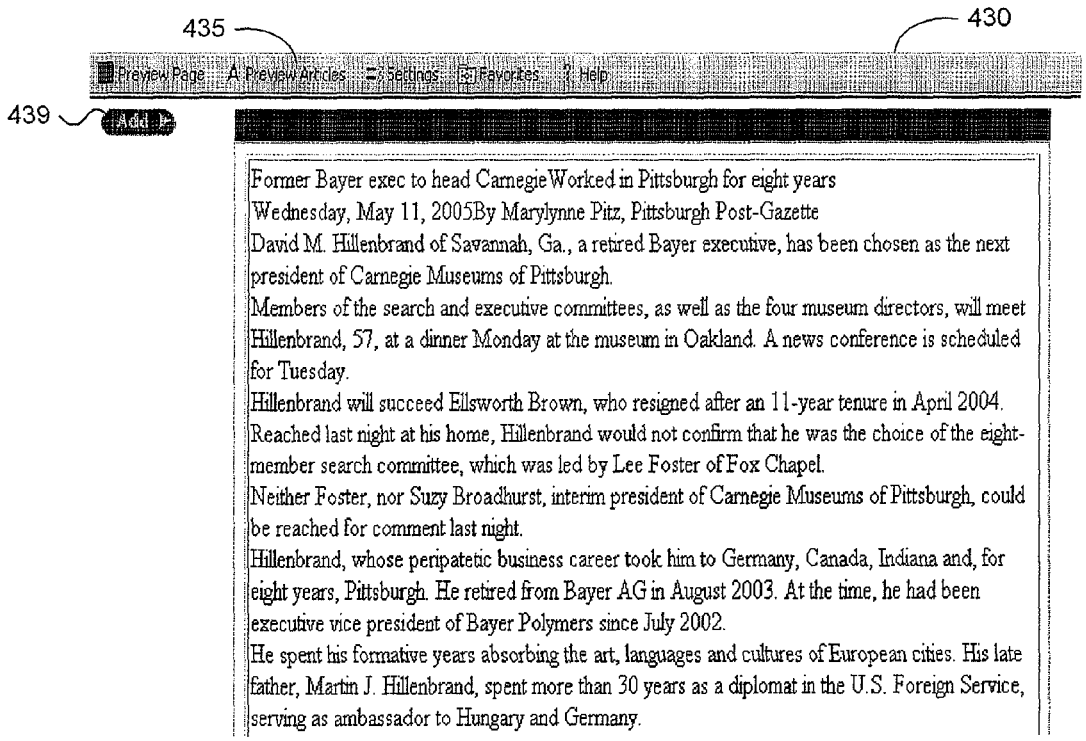
FIG. 4C is a screenshot showing another view of the toolbar provided in the currently preferred embodiment of the present invention.
Figure 4D:
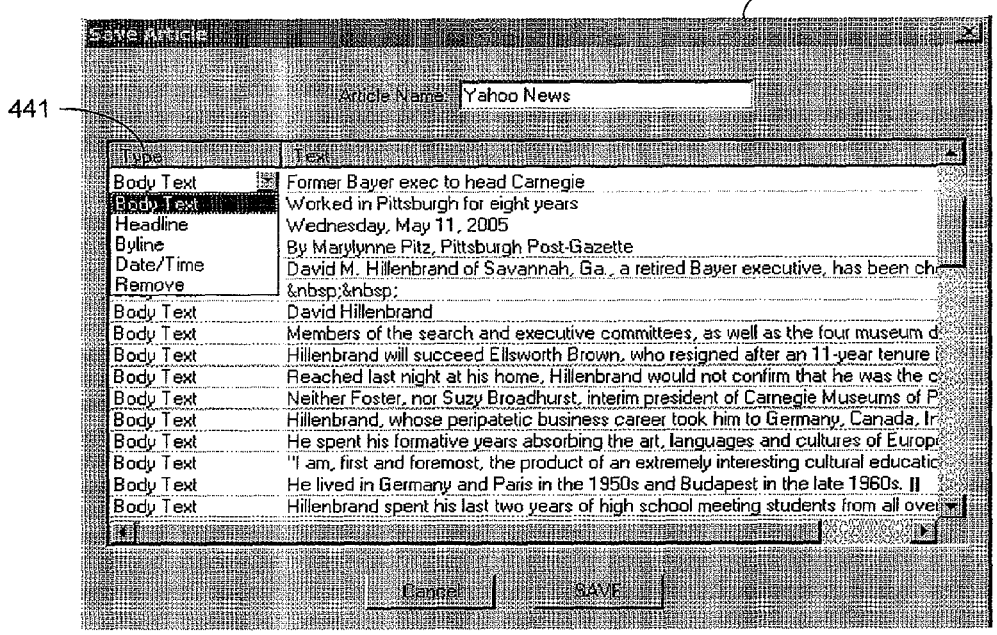
FIG. 4D is a screenshot illustrating a "save article" dialog provided in the currently preferred embodiment of the present invention.
Figure 4E:
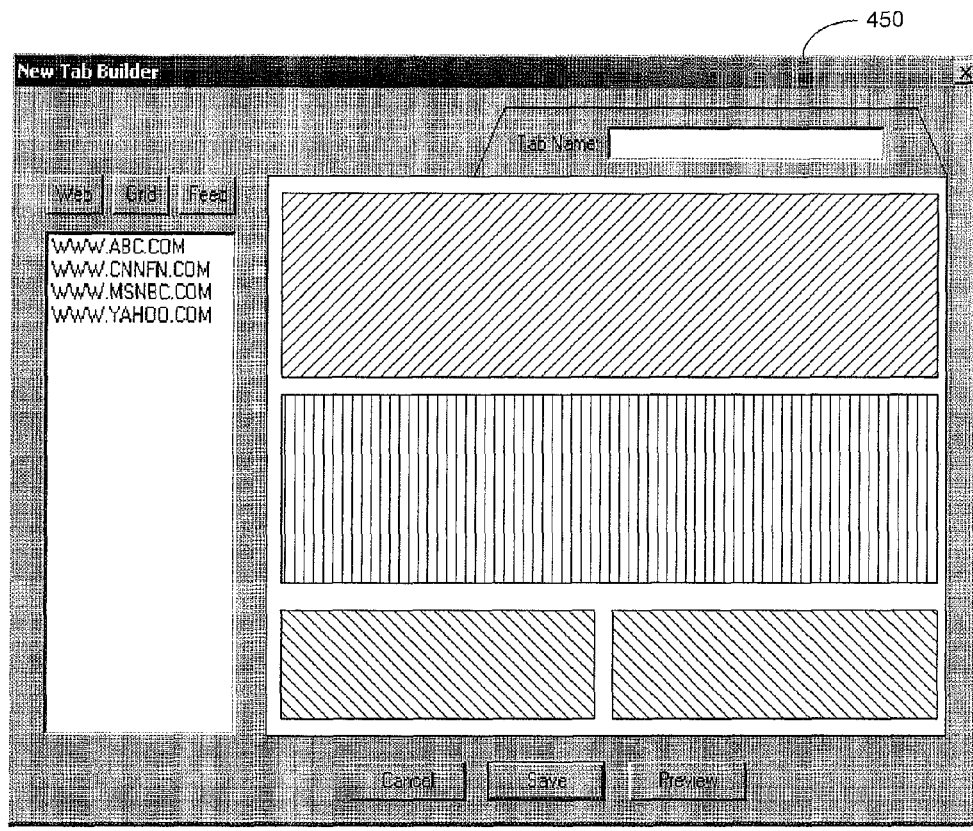
FIG. 4E is a screenshot of a TabBuilder dialog provided in the currently preferred embodiment of the present invention.

FIG. 4C is a screenshot showing another view of the toolbar provided in the presently preferred embodiment. When a page is divided into objects, if the page contains an "article", a "Preview Article" icon 435 is displayed as illustrated on the toolbar 430 at FIG. 4C. When the "Preview Article" icon 435 is selected (e.g., clicked on) the page is divided into "articles" that exist on the source page. Currently, two renderings of each article are displayed. The first rendering is the text only article; while the second is the article with HTML styles used on the source page. If the user clicks on the "Add" button (e.g., as shown at 439 at FIG. 4C), an "save article" dialog is displayed. FIG. 4D is a screenshot illustrating the "save article" dialog 440 provided in the currently preferred embodiment of the present invention. Using the "type" pop up menu 441, the user can match the article with a list of text styles such as "Body Text", "Headline", "Byline", and so forth. This user interface can also be used to attach "voice commands" to this example of text. An important thing to note is that once an object is saved these settings will be used to capture and extract "any" article on the source site. The captured article can then be syndicated as desired by the user (e.g., the article re-purposed for display on a handheld device). Articles that have been selected can then be organized on one or more viewpoint pages created by the user. For example, after several articles have been selected the user can combine the articles into an HTML page or an RSS feed for display on a handheld device. By clicking on a "TabSet" icon, a TabBuilder dialog box which can be used for creating a page (or an RSS feed) is displayed. FIG. 4E is a screenshot of a TabBuilder dialog 450 provided in the currently preferred embodiment of the present invention. The "TabBuilder" dialog 450 allows the user to create objects on a page with the mouse and then "drag" selected objects that have been saved to boxes on the page for display. Sources from several dissimilar sources (e.g., Web sites) can be combined to create a viewpoint page containing personalized content derived from different sources.

The present invention also includes a "score and select" search feature. The "score and select" feature is designed to work with existing search engines or Web directories, such as Google, AltaVista, Excite, and the like. In the currently preferred embodiment of the present invention, the score and select search feature prompts the user for a search query and then makes the request to the destination search engine. The search engine will return a list of links that will be used to power the score and select search. These links, instead of being displayed to the user directly, are used by the score and select module of the present invention to collect each reference returned by the search engine. As the page is collected, the page is parsed into information "atoms" (objects) and scored for its quality content. Depending on the content score, different CCL objects are used to collect data from the page. For example, a page with high "headline" score is parsed and displayed using a headline capture process. A page with a high text score is displayed using an "article" capture object. A high graphic score will result in use of a "graphic" capture object. Currently, if the page scores low on all specialized targets a "Page" object capture is used.

Figure 4F:
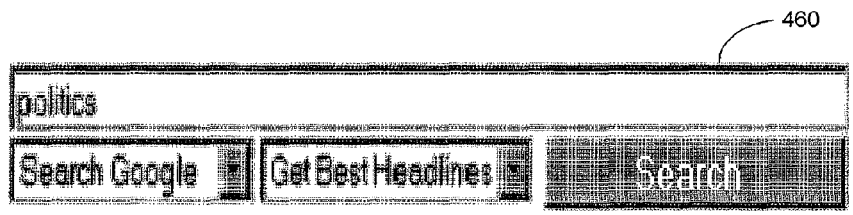
FIG. 4F is a (partial) screenshot illustrating a score and select search dialog box provided in the currently preferred embodiment of the present invention.

These operations may be illustrated by example. For instance, when a user selects (clicks on) a Search toolbar icon provided in the currently preferred embodiment a dialog box is displayed. FIG. 4F is a (partial) screenshot illustrating a score and select search dialog box 460 provided in the currently preferred embodiment of the present invention. In the example shown at FIG. 4F, Google is used as the search engine and the goal is to find pages that have the "best headlines". An alternative query might have been to get the "best articles". The Google results are used to explore each page for content that meets the search criteria. The importance of this feature is that an individual with a mobile device can execute a query and only those pages that meet that criteria are returned. It may be that the user only wants to see pages that score highly using a Google search and that also have an article on the page. By selecting the article the second search will return only that article and not the entire HTML page. In this way, the feature takes account of the fact that the handheld device has a small screen size and the score and select software (module) filters out the rest of the content.

Detailed Operation

The following description presents method steps that may be implemented using processor-executable instructions, for directing operation of a device under processor control. The processor-executable instructions may be stored on a computer-readable medium, such as CD, DVD, flash memory, or the like. The processor-executable instructions may also be stored as a set of downloadable processor-executable instructions, for example, for downloading and installation from an Internet location (e.g., Web server).

Building a Viewpoint Page

Figure 5A:
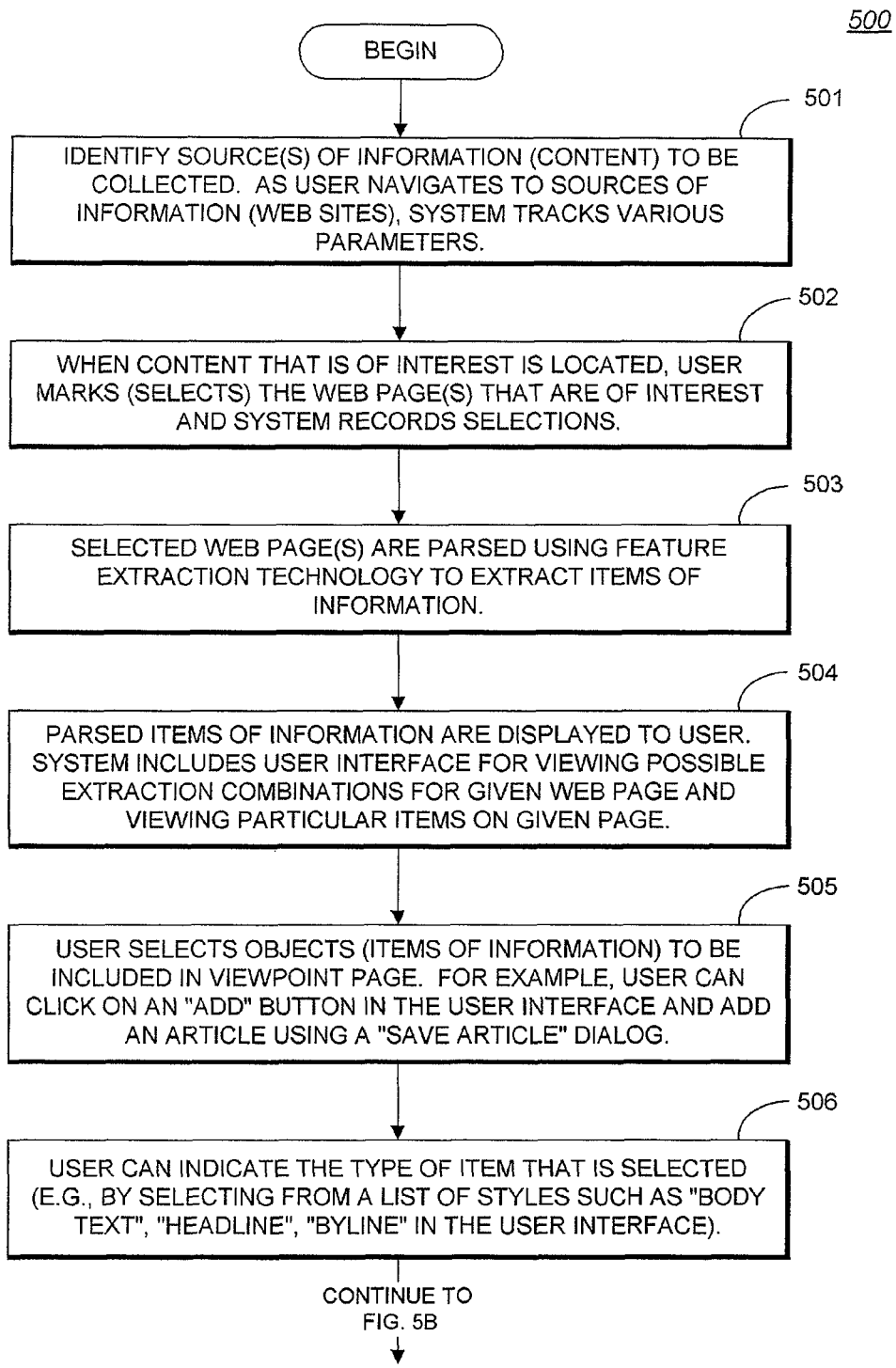
FIGS. 5A-B comprise a single flowchart illustrating the high-level operations of the present invention in building a viewpoint page aggregating content from multiple sources.
Figure 5B:
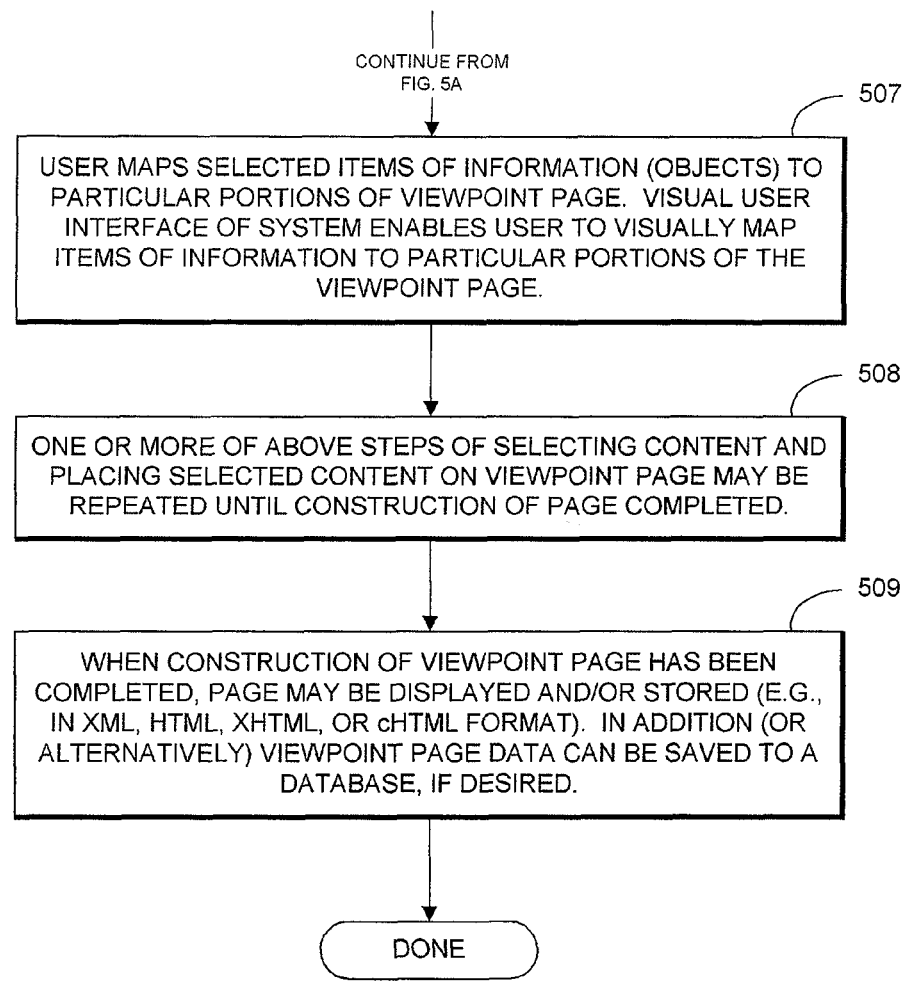

The following discussion illustrates the operations of the present invention using an example of a user that is building a viewpoint page of collected content. Typically, all of the information that the user wants to include on the viewpoint page is not already available and collected on a single Web page (HTML page). However, using the system and methodology of the present invention, information can be collected from multiple sources and aggregated for display in a browser interface as described below. FIGS. 5A-B comprise a single flowchart 500 illustrating the high-level operations of the present invention in building a viewpoint page aggregating content from multiple sources. The process begins at step 501 with identifying the source(s) of the information (content) of interest that is to be collected. The user may use the above-described user interface to navigate to sources of information (e.g., Web site(s)) from which data is to be collected (e.g., URLs of Web site(s) or CCL statements). In the background, the system tracks various parameters as the user browses various Web sites. For example, the user may select a financial Web site as a source of stock information. A second Web site may be selected for interest rate information, and a third Web site selected for commodity prices. When content that is of interest is located, at step 502 the Web page(s) that are of interest are marked (selected) by the user. The system records the Web page(s) that are selected.

After the sources of information of interest are marked, the user can proceed to select the particular content and indicate how the selected content should be organized on the viewpoint page. At step 503, the system of the present invention parses the identified Web page(s) using the Feature Extraction technology to extract items of information from the selected information sources (Web page(s)). The parsed items of information are displayed to the user at step 504. As described above, the RCAS system includes a user interface which includes a "Preview Page" feature to view the possible extraction combinations for a given Web page and preview items on the page. For example, a "Preview Article" feature enables the user to view particular articles on a page. At step 505, the user selects objects (items of information) that are to be included in the viewpoint page that is under construction. For example, the user can click on an "Add" button in the user interface and add an article using an "save article" dialog as described above. At step 506, the user can also indicate the type of item that is selected (e.g., by selecting from a list of styles such as "Body Text", "Headline", "Byline" in the user interface as described above). At step 507, the user maps the selected items of information (objects) to particular portions of the viewpoint page under construction. As described above, a visual user interface is provided in the currently preferred embodiment of the system to enable a user to visually map items of information to particular portions of the viewpoint page. It should be noted that the user will frequently perform the above tasks in an interactive fashion and not necessarily the specific order indicated above. For instance, after the user has placed several items on the viewpoint page, he may view the resulting page and then subsequently make modifications and additions. At step 508, one or more of the above steps of selecting content and placing the selected content on the viewpoint page may be repeated until the construction of the page is completed. When the construction of the page has been completed, at step 509 the viewpoint page may be displayed and/or stored (e.g., in XML, HTML, XHTML, or cHTML format, as desired). In addition (or alternatively) the viewpoint page data can be saved to columns and rows (i.e., tables) of a database if desired. However, the present invention does not require use of a database repository.

After a viewpoint page has been created, the user may (optionally) transfer the page to a mobile device (e.g., handheld device). When a new aggregated feed is displayed on a handheld device, the score and select techniques described herein may be used to retrieve a particular article. For example, in the handheld device environment today there are a lot of RSS feeds available for delivering news to an individual handheld device. The user of the individual handheld device can see the title of the news article and a news snippet. However, if he wants to see the entire article he will click on the title of the article and the entire HTML page of the information source is displayed. Often, the article can be difficult to read because of the small size of the handheld screen. With the "score and select" functionality of the present invention, when the user clicks on the title of an article, the system will retrieve and display only the desired article with the styles selected during the save article dialog process. All other HTML on the source page is ignored. This allows users to easily customize the content that is displayed based on device capabilities.

Real-Time Content Aggregation

Figure 6:
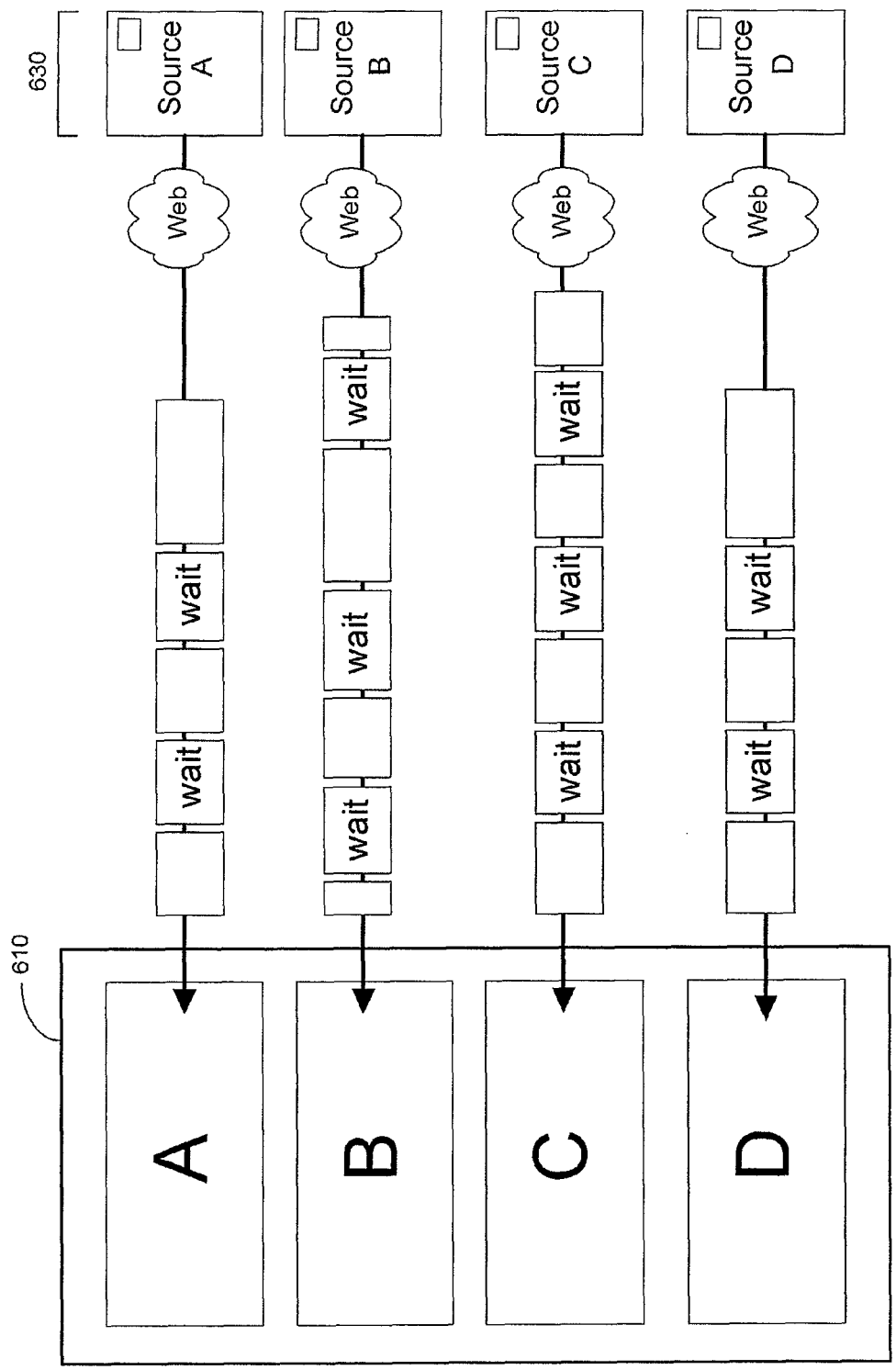
FIG. 6 is a block diagram illustrating an aggregation (viewpoint) page made up of content from several different sources.

In prior art systems, the standard approach for aggregating content involves bringing all of the content into a local repository (e.g., database). Pages that are to be displayed to users are then built from the components in the local database repository. The RCAS system of the present invention takes advantage of advances in technology to "multi-thread" content retrieval and enable content retrieval to be performed in real time. FIG. 6 is a block diagram illustrating an aggregation (viewpoint) page 610 made up of content from several different sources 630. The viewpoint page 610 is created in real time by going to the respective source pages (e.g., sources A, B, C, D as shown at 630 at FIG. 6) and extracting the targeted information. Each page is different and some are more difficult to parse and extract information from than others. By using multi-threaded processing routines and techniques, the RCAS system takes full advantage of the browser's multi-threaded capabilities. Moreover, as multi-threaded chip architectures are developed, the RCAS system's "message layer" can be embedded into computer chips. The user experience is the same as if he or she were viewing a single page composed by a single source out of a content repository. This process delivers "aggregated content on demand" by aggregating and delivering only the information that is desired by the user. Wasted content that is not desired is not retrieved (or stored), thereby conserving computing resources. The approach of the present invention represents a considerable improvement compared to prior art systems which retrieve quantities of information that are saved in a repository but are never viewed by the user. Small devices can also take full advantage of this present invention to aggregate information in the background while doing other tasks.

An additional application of this technology is to aggregate selected content in real-time while monitoring the information that is being retrieved for adding advertising "spacers" to the personalized data feed or web page between the retrieved content objects. For example, if the user has aggregated several news articles on travel, the system can be used to insert advertisements for airline travel or resort sites. In this way the content is "ultra-personalized" and the ads that are displayed are also personalized for that user.

Figure 7:
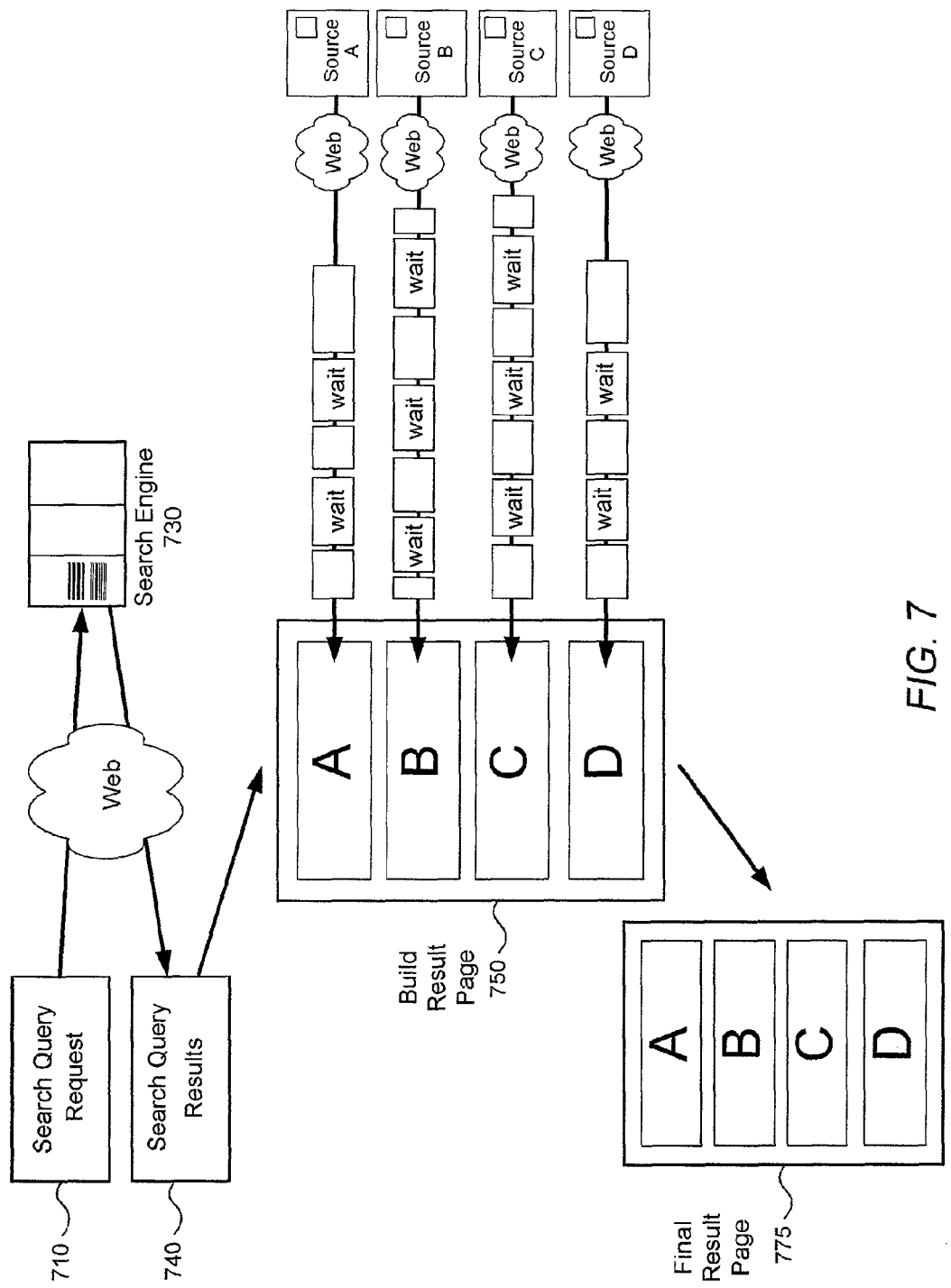
FIG. 7 is a block diagram illustrating the multi-threaded operations of the RCAS system of the present invention during a score and select search.

FIG. 7 is a block diagram illustrating the multi-threaded operations of the RCAS system of the present invention during performance of a score and select search. A "score and select" search is an example of an operation where the multi-threading aspects of the present invention are particularly useful. When a score and select search is performed, the composite page (viewpoint page presented to user) is made up of results of many threads operating in parallel. As shown at FIG. 7, a Search Query Request 710 is sent to the Search Engine 730, and a list of possible links is returned as Search Query Results 740. Using the score and select feature combined with the multi-threaded page building process (as illustrated at 750 at FIG. 7), each search result is checked to determine if the "content quality" of the source meets the user's requirements. The score and select process and the building of the page is done in real-time without requiring the use of a content repository. The final result page 775 which is built based on the results of the score and select search is displayed to the user. The final result page delivers a more focused set of information that is more likely to meet the requirements of the user.

Figure 8:
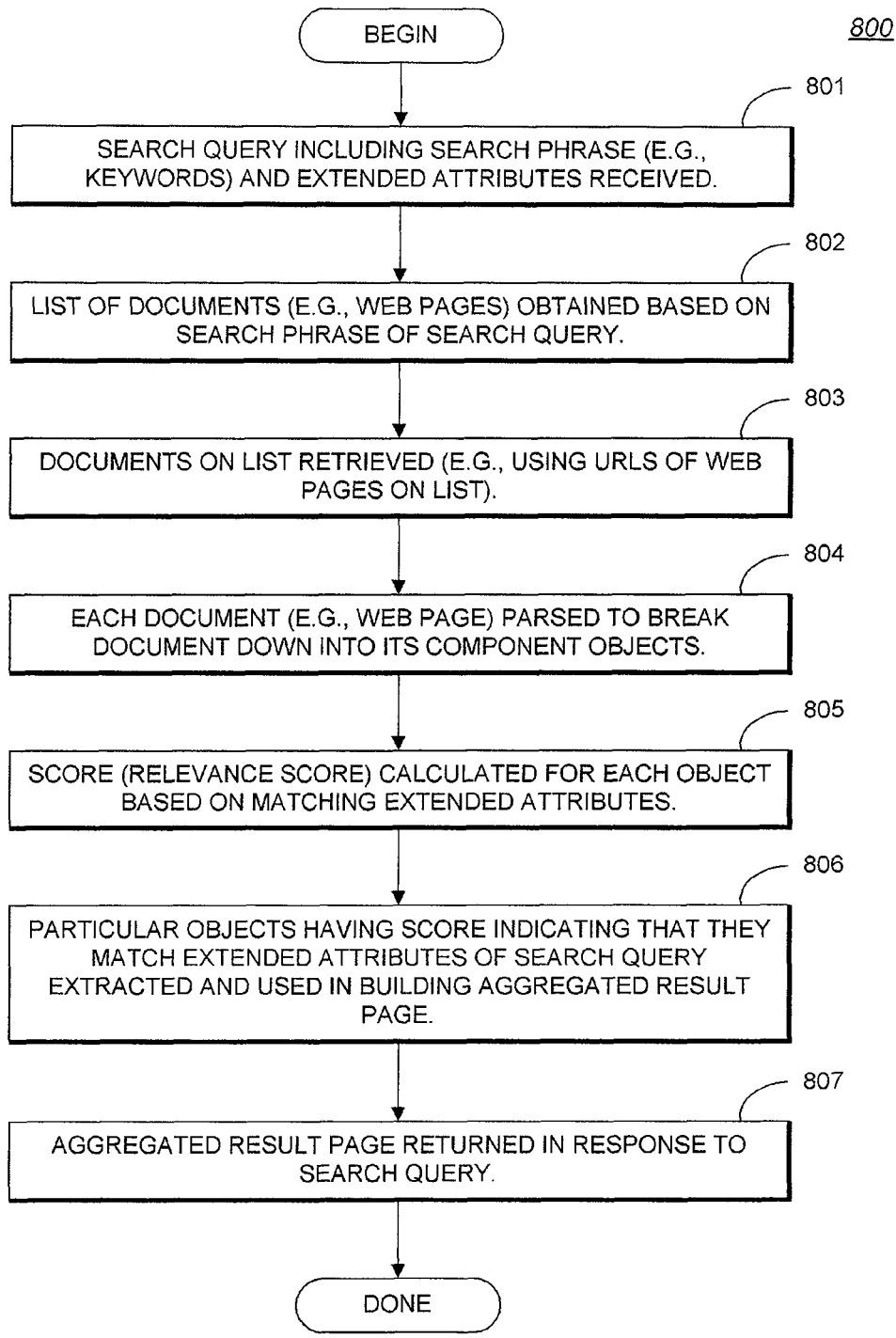
FIG. 8 comprises a flowchart illustrating the score and select search methodology of the present invention in further detail.

FIG. 8 comprises a flowchart 800 illustrating the score and select search methodology of the present invention in further detail. The following discussion uses an example of an Internet search for locating items of content available on the Internet. It should be noted, however, that the methodology of the present invention may also be used for searching other types of documents (e.g., documents stored on the hard disk(s) of one or more computer systems). At step 801, a search query requesting items of content is received from a user. This search query may include normal search criteria, such as a search phrase which may, for instance, include keywords indicating a subject matter of interest. The present invention also provides mechanisms for the user to specify attributes (extended attributes) of items of content which are of interest. These extended attributes may include the specific type of item (content) that he or she is interested in receiving (e.g., headlines, images, and so forth). In addition to type, extended attributes may also include size of an item (e.g., greater than 100 words and less than 300 words) and other criteria which enable a user to more particularly specify the particular items that are of interest. The user may, for example, be currently using a mobile device and may only be interested in viewing headlines of news articles. For instance, the user may initiate search for headlines using the search term "politics" as shown at FIG. 4F. Based on the search term (e.g., "politics") a list of matching documents (e.g., Web pages) is returned. This can be done by matching the search term with searchable text of the documents using a search engine. The matching documents are then processed to identify and extract particular items of content which match the extended attributes (e.g., extract headlines if that is the particular type of item the user is interested in obtaining). This is done by breaking the document into its component objects, calculating a score for each of the objects, and selecting objects having scores indicating correspondence to the extended attributes as hereinafter described.

The score and select search initially involves a search (e.g., Internet search using Internet search engine) for retrieving documents based on search criteria (search phrase) of the search query. The search phrase may, for example, comprise one or more keywords (e.g., the keyword "politics" in this example). At step 802, a list of documents (e.g., Web pages) is obtained based on the search phrase of the search query. An Internet search engine such as Google or Alta Vista can be used for performing this portion of the score and select search. A conventional search would simply return the list of matching documents (links) to the user, typically presenting the list of matching documents in an order or ranking based on relevance of the documents to the search phrase and other factors. The present invention provides an improved approach for identifying, retrieving, and aggregating only those particular items included in the documents (e.g., particular items of content in Web pages) that are of interest to the user.

At step 803, each of the documents on the list is retrieved (e.g., using URLs of Web pages on the list). When possible, this operation and the following operations for building the aggregated result page are done in parallel using multiple threads as shown at FIG. 7 so as to speed the process of returning the results. At step 804, each of these documents (e.g., Web pages) is parsed to break the document down into its component objects. Each of these component objects represents a particular item of content. A Web page may, for example, contain one or more headlines, graphic objects, images, articles, text (e.g., body text or other runs of text), bylines, buttons, and other such identifiable objects. The process of breaking down a page is described below in more detail. At step 805, a "score" or "relevance score" is calculated for each of these content objects by the system of the present invention. The score for an object is calculated based on correspondence of attributes of the object to the extended attributes of search query (e.g., in the example search the score indicates whether the object represents a headline). Items of content (content objects) having attributes corresponding to those specified in the search query are given a higher score, which indicates a greater degree of relevance. The process of scoring content objects is described in further detail below. At step 806, the particular objects having a score indicating that they match extended attributes of the search query (e.g., headlines, the type of information the user is interest in viewing) are extracted and used in the building of the aggregated result page (e.g., the final result page 775 as shown at FIG. 7). At step 807, the aggregated result page is returned in response to the user's search query. The final result page displays particular items of content responsive to the search query in a single document (e.g., "headlines" having to do with "politics") which is built based on extracting these items from one or more documents (e.g., Web pages). The final result page is displayed to the user in a Web browser interface, enabling the user to navigate to particular items of interest. If desired, the results may also be syndicated for distribution to other devices and/or users as previously described.

Example of Multi-Threaded Collection Operations

The following code illustrates an example of the multi-threaded operations performed in the currently preferred embodiment of the present invention during a score and select search in greater detail:

```
 1: Thread[ ] thread = new Thread[__numThreads];
 2:
 3:
 4: /// all HTML tags have handlers that are called from the page parser.
 5: /// The 'handleAnchor' handler will extract the URL from the anchor
 6: /// and add it to a thread that will extract the desired content from
 7: /// the search result page.
 8:
 9:    protected void handleAnchor( ) throws IOException
10:        {
```

```
11:     String anchorText = "";
12:     theVisibleText =
        FEStatic.RemoveMultipleWhiteSpace(theVisibleText);
13:
14:     ZHashtableNS attributes = __parserUtils.getAttributes( );
15:     if (attributes == null) return;
16:
17:     String href = (String)attributes.get(HTML__ATTR__HREF);
18:
19:             // consume all until </a>
20:             for (;;)
21:             {
22:                 String text = __parserUtils.getTextUntilNextTag( );
23:                 if (text == null)
24:                 {
25:                     break;
26:                 }
27:         if (text.length( ) > 3)
28:         {
29:         anchorText += text;
30:         }
31:                 String tagName = __parserUtils.getNextTagName( );
32:                 // now check for </a>;
33:                 if (tagName.toLowerCase( ).equals("/a"))
34:                 {
35:                 // make sure to remove the rest of the
36:                 </a tag__parserUtils.getRestOfTag( );
37:                 break;
38:                 }
39:             } // for
40:
41:     /// Now I have extracted the URL of the search results
42:     /// I can create a new thread to score and extract the
43:     /// targeted results
44:
45:
46:         if (thisAnchor < numThreads)
47:         {
48:     // create new FeatureExtraction object
49:     // that will get the page and retrieve only desired content
50:
51:             getTargetedContent = new ExtractScoreSelect( );
52:             thread[thisAnchor] = new Thread(getTargetedContent);
53:             thread[thisAnchor++].start( );
54:         }
55: } // handleAnchor
56:
57:
58: /// When all of the search page anchors have been parsed
59: /// Aggregate the respective page content results as the threads
are completed
60:
61:
```

The above code example illustrates a portion of the search page parser that starts a thread for each anchor. The thread will then go to each page in the search list and extract the user's desired content. HTML tags have handlers that are called from the page parser. The "handleAnchor" handler shown above at lines 9-55 extracts the URL from the anchor and adds it to a thread that extracts the desired content from the search result page. After the URL of the search results is extracted, a new thread can be created to score and extract the targeted results. As shown at lines 51-53, a new FeatureExtraction object is created that will get the page and retrieve only the desired content. More particularly, the class ExtractScoreSelect is created as shown at lines 51-53 and uses the below routine to "score" the attributes of each object on the page. If the score of an object is greater than the minimum, the object is returned to the parent for inclusion into the result page of aggregated content. When all of the search page anchors have been parsed, the respective page content results are aggregated as the threads are completed.

The following routine "scores" the attributes of each object on a page:

```
1:
2:      URL thisURL = new URL(theURL);
3:
4:      CachedURL thisCachedURL = new CachedURL(thisURL);
5:
6:      FECell1 fec1 = new FECell1(thisCachedURL);
7:          String tag;
8:          FEState1 theState = null;
9:      // divide each page into an array of objects called 'states'
10:         fec1.getFEStates( );
11:
12:         long highScore = 0;
13:         String highTag = "";
14:
15:         // for each object on the page examine the TableTag to see if it
16:         //   fits our desired target description score.
17:         if (fec1.__tableTags.size( ) > 1)
18:         {
19:         for (int i = 1;i < fec1.__tableTags.size( ); i++)
20:             {
21:                 theBody = "";
22:                 theState =
                    (FEState1)fec1.__tableTags.elementAt(i);
23:                 tag = theState.getTableTag( );
24:
25:
26:             long score = 0;
27:             score += tag.charAt(IMAGE__ATTRIBUTE) * 800;
28:             score += tag.charAt(TEXT__ATTRIBUTE) * 1000;
29:             if (score > highScore)
30:             {
31:             highScore = score;
32:             highTag = tag;
33:             }
34:             }
35:         theCCL =
            FEStatic.buildQuickCCLcommand(theURL, "",highTag);
36:         }
37:
```

As shown, the routine operates on a page identified by a URL. At line 10, the getFEStates( ) routine divides the page into an array of objects called "states". For each object on the page, the TableTag is examined as shown at lines 17-36 to calculate a score. If the score indicates the item is of the type requested (i.e., matches extended attributes of the search query), the object is returned for inclusion in the page of aggregated content that is under construction.

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

What is claimed is:

1. A method for generating a single document containing items of content retrieved from one or more Web pages, the method comprising:

receiving, via a communication port that is in communication with a central processing unit, a request for one or more items of content, the request comprising (a) one or more keywords and (b) one or more extended attributes;

programmatically retrieving one or more Web pages based on at least the one or more keywords;

parsing via software each of the one or more Web pages into one or more component objects, each component object (a) representing an item of content from the one or more Web pages and (b) yielding one or more feature extraction objects;

selecting, based on different of (a) the one or more extended attributes and (b) the one or more feature extraction objects, particular component objects yielding selected component objects; and aggregating the selected component objects into a single document, wherein each feature extraction object is represented by a feature extraction tag including a numeral indicating an occurrence of a given feature extraction object in the single document, and wherein the feature extraction tag further comprises an indication of a type of the feature extraction object and a version thereof.

2. The method of claim 1, wherein the method is performed at a client device.

3. The method of claim 2, wherein the method is performed within a software application.

4. The method of claim 3, wherein the software application is a Web browser.

5. The method of claim 1, wherein the one or more extended attributes comprise an item type.

6. The method of claim 5, wherein the item type comprises one of (a) a headline, (b) text, (c) an article, (d) a graphic object, (e) an image, (f) a byline, or (g) a button.

7. The method of claim 1, wherein the one or more extended attributes comprise an item size.

8. The method of claim 1, wherein the method is performed on a server.

9. A processor-based system for generating a single document containing items of content retrieved from one or more Web pages, the processor-based system comprising:

an interface configured to receive a request for one or more items of content, the request comprising (a) one or more keywords and (b) one or more extended attributes; and application software configured to:

retrieve one or more Web pages based on at least the one or more keywords, parse each of the one or more Web pages into one or more component objects, each component object (a) representing an item of content from the one or more Web pages and (b) yielding one or more feature extraction objects, select, based on different of (a) the one or more extended attributes and (b) the one or more feature extraction objects, particular component objects yielding selected component objects, and aggregate the selected component objects into a single document, wherein each feature extraction object is represented by a feature extraction tag including a numeral indicating an occurrence of a given feature extraction object in the single document, and wherein the feature extraction tag further comprises an indication of a type of the feature extraction object and a version thereof.

10. The processor-based system of claim 9, wherein the processor-based system is implemented on a client device.

11. The processor-based system of claim 10, wherein the processor-based system comprises a Web browser.

12. The processor-based system of claim 9, wherein the one or more extended attributes comprise an item type.

13. The processor-based system of claim 12, wherein the item type comprises one of (a) a headline, (b) text, (c) an article, (d) a graphic object, (e) an image, (f) a byline, or (g) a button.

14. The processor-based system of claim 9, wherein the one or more extended attributes comprise an item size.

15. The processor-based system of claim 9, wherein the processor-based system method is implemented on a server.

* * * * *